US010098503B2

(12) United States Patent
Uriarte et al.

(10) Patent No.: US 10,098,503 B2
(45) Date of Patent: **\*Oct. 16, 2018**

(54) SOLVENTLESS FIRE IGNITION SYSTEMS AND METHODS THEREOF

(71) Applicant: The Clorox Company, Oakland, CA (US)

(72) Inventors: Richard J. Uriarte, Danville, CA (US); William R. Ouellette, Livermore, CA (US); Andrew J. Skulan, Plesanton, CA (US); Andrew L. Leppla, Durham, NC (US); Jennifer R. Finigan, Oakland, CA (US); Michael J. Petrin, Walnut Creek, CA (US); Marisa MacNaughtan, Pleasanton, CA (US); Timothy Mui, Pleasanton, CA (US); Roger V. Lee, Pleasanton, CA (US)

(73) Assignee: The Clorox Company, Oakland, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 15/616,696

(22) Filed: Jun. 7, 2017

(65) Prior Publication Data

US 2017/0265682 A1   Sep. 21, 2017

Related U.S. Application Data

(63) Continuation-in-part of application No. 14/828,939, filed on Aug. 18, 2015, now Pat. No. 9,700,174.

(Continued)

(51) Int. Cl.
*A47J 37/00* (2006.01)
*A47J 37/07* (2006.01)
(Continued)

(52) U.S. Cl.
CPC ............ *A47J 37/079* (2013.01); *A47J 27/00* (2013.01); *A47J 33/00* (2013.01); *A47J 37/00* (2013.01)

(58) Field of Classification Search
CPC   A47J 37/079; A47J 33/00; A47J 27/00; A47J 37/00
(Continued)

(56) References Cited

U.S. PATENT DOCUMENTS 3,976,046 A \* 8/1976 Morton ............... A47J 37/0763
126/25 A
6,101,931 A \* 8/2000 Miklos ................ A47J 37/0768
126/145

(Continued)

*Primary Examiner* — Gregory Huson
*Assistant Examiner* — Nikhil Mashruwala
(74) *Attorney, Agent, or Firm* — Ann Lee

(57) ABSTRACT

A combustible charcoal igniting device may include first elongate grid members generally parallel to one another when the device is in an uncollapsed configuration and second elongate grid members generally parallel to one another and transverse relative to the first elongate grid members when the device is in the uncollapsed configuration. The first and second elongate grid members define chimney cells on or above which charcoal briquets may be placed for ignition. The elongate grid members may comprise a combustible material that can be ignited and that will continue to burn, igniting charcoal briquets placed on the chimney cells. The first elongate grid members may include creases that align with one another, so that the device is collapsible from opposed sides towards a crease line defined by the creases to reduce the length of the device when in a collapsed configuration.

4 Claims, 17 Drawing Sheets

Related U.S. Application Data

(60) Provisional application No. 62/040,239, filed on Aug. 21, 2014.

(51) Int. Cl.
*A47J 33/00* (2006.01)
*A47J 27/00* (2006.01)

(58) Field of Classification Search
USPC .................................. 126/25 B, 9 B; 99/449
See application file for complete search history.

(56) References Cited

U.S. PATENT DOCUMENTS

| | | | | |
|---|---|---|---|---|
| 6,279,468 | B1* | 8/2001 | Webster | A47J 37/0763 126/25 R |
| 8,047,196 | B1* | 11/2011 | Schacht | A47J 37/07 126/274 |
| 8,887,709 | B2* | 11/2014 | Ellis | F24B 1/205 126/25 B |
| 2008/0190410 | A1* | 8/2008 | Krippelz | A47J 37/079 126/25 B |
| 2012/0204852 | A1* | 8/2012 | Boucher | A47J 37/0763 126/30 |
| 2013/0032134 | A1* | 2/2013 | Valzania Fresa | A47J 37/079 126/25 B |
| 2013/0220313 | A1* | 8/2013 | Ellis | A47J 33/00 126/9 B |
| 2015/0289717 | A1* | 10/2015 | Haski | A47J 37/079 126/25 B |
| 2016/0075961 | A1* | 3/2016 | Leveen | C10L 11/04 126/25 B |

* cited by examiner

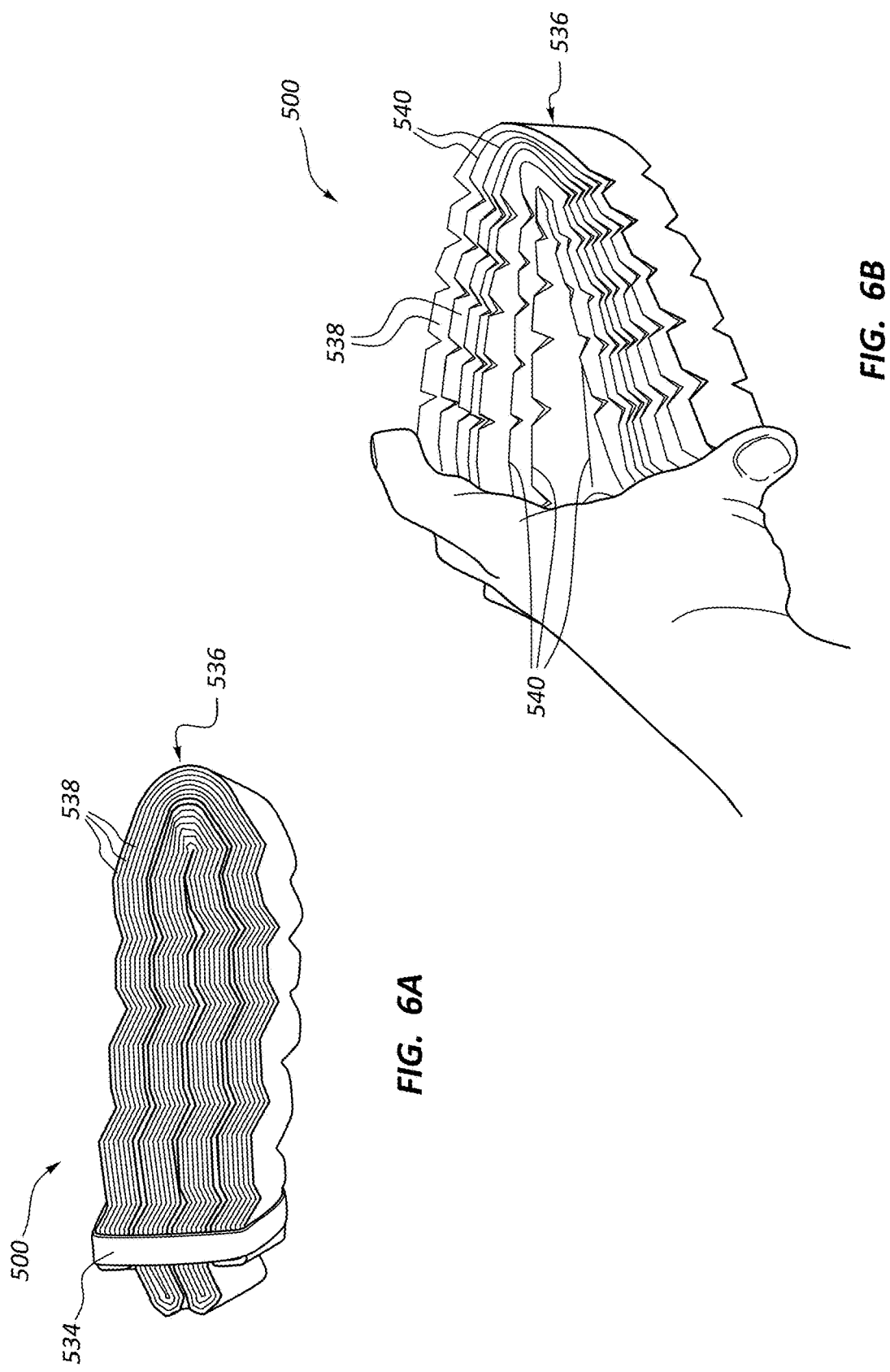

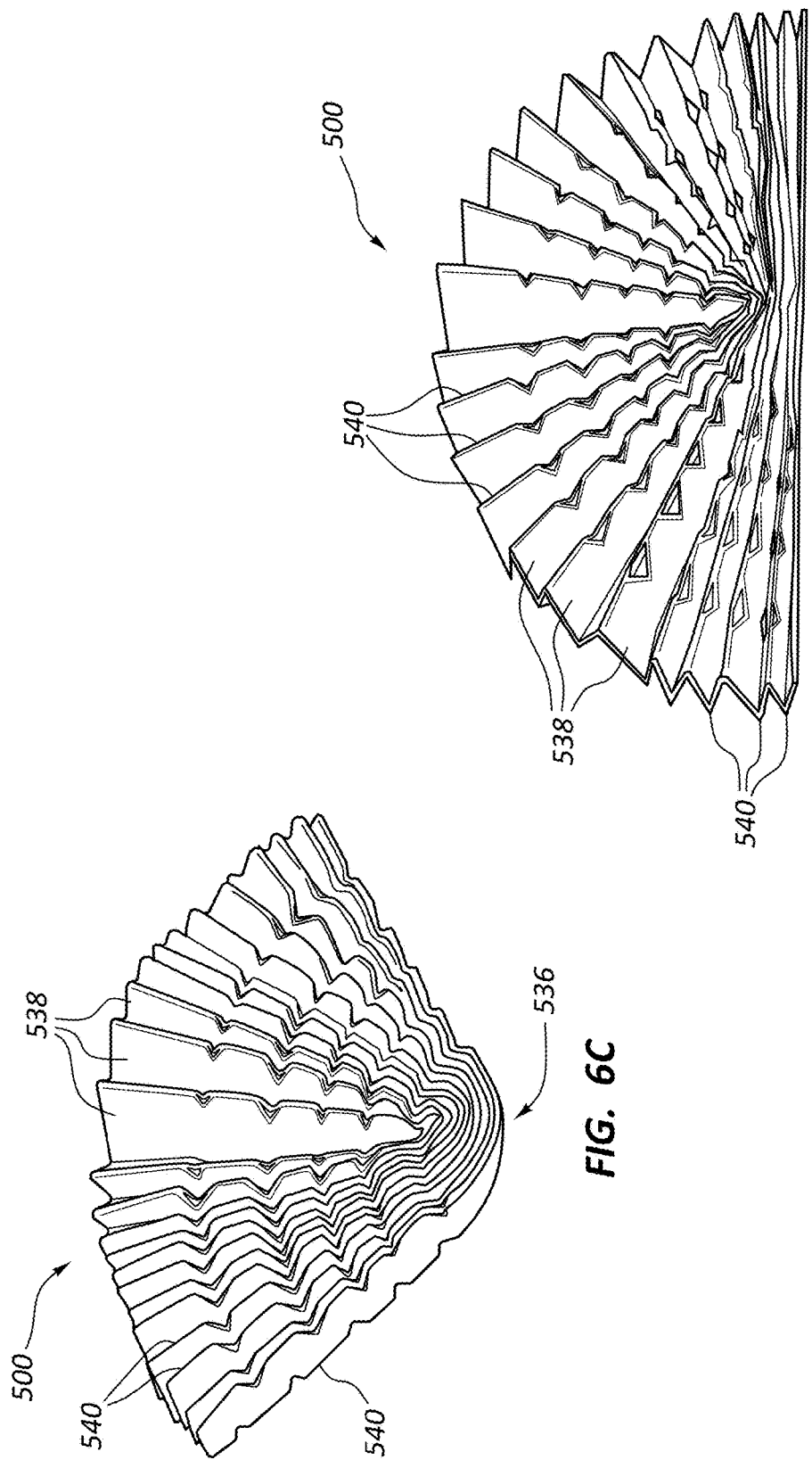

SOLVENTLESS FIRE IGNITION SYSTEMS AND METHODS THEREOF

CROSS-REFERENCE TO RELATED APPLICATIONS

The present application is a continuation-in-part of U.S. patent application Ser. No. 14/828,939, filed Aug. 18, 2015 and entitled "SOLVENTLESS FIRE IGNITION SYSTEMS AND METHODS THEREOF, which claims the benefit of U.S. Patent Application Ser. No. 62/040,239, filed Aug. 21, 2014 and entitled "SOLVENTLESS FIRE IGNITION SYSTEM AND METHOD THEREOF". The disclosure of each of the above is incorporated by reference in its entirety.

BACKGROUND OF THE INVENTION

1. The Field of the Invention

The present invention relates to devices for use with charcoal fuel heating materials. Specifically, the invention relates to devices for use in starting combustion of charcoal for subsequent use of the charcoal in cooking (e.g., grilling).

2. Relevant Art

Charcoal heating materials, such as charcoal briquets, are commonly used for cooking food. Foods cooked with charcoal can have a unique flavor and have wide appeal. Conventional charcoal briquets generally provide a relatively slow-burning fuel with a high BTU output.

One of the shortcomings of conventional charcoal briquets is that the briquets can be difficult to ignite and may not continue to burn, even after they appear to have been ignited. To address this problem, lighter fluid may be sprayed onto the briquets by the user immediately prior to use, or may be applied during manufacture to provide "easy-to-light" briquets. Still, some feel that use of such flammable petroleum-based materials may impart unwanted flavors to the food. Additionally, the use of lighter fluid emits volatile organic compounds (VOCs), which could potentially have an effect on air quality.

In addition to the difficulty in lighting conventional charcoal briquets, once ignited, conventional charcoal briquets typically must complete an initial "ignition phase," or formation of visible ash on a majority of the briquet before they are suitable for cooking. Once past the ignition phase, the briquets burn with an intense heat throughout a "burn phase" during which a consumer can use the briquets for cooking. Unfortunately, the ignition phase of conventional briquets often requires considerable time. As such, there exists a continuing need for alternative ways for igniting charcoal briquets, particularly methods that could provide for equal or even faster ignition, and "time to cooking readiness", without the need for any lighter fluid.

BRIEF SUMMARY

Implementations of the present disclosure comprise devices, methods, and kits for igniting charcoal briquets or another combustible material wood, etc.). For example, at least one embodiment describes a collapsible combustible charcoal igniting device that includes a plurality of first elongate grid members, wherein each of the first elongate grid members is generally parallel to one another when the device is in an expanded, uncollapsed configuration. The device may further include a plurality of second elongate grid members, wherein each of the second elongate grid members is generally parallel to one another and the second elongate grid members are transverse relative to the first elongate grid members when the device is in the expanded, uncollapsed configuration, such that the first and second elongate grid members define a plurality of chimney cells on which a plurality of charcoal briquets may be placed for ignition. The first and second elongate grid members may be formed from a combustible material that can be ignited and that will continue to burn, and which will ignite charcoal briquets placed thereon.

The device may be collapsible. For example, the first elongate grid members may be configured to collapse from the uncollapsed configuration in which the first elongate grid members are transverse relative to the second elongate grid members to a collapsed configuration in which the first elongate grid members and second elongate grid members are generally parallel to one another. Such a collapsed configuration greatly reduces the volume occupied by the device, e.g., it may be in the form of a collapsed relatively thin strip in which the grid members are generally parallel when collapsed, and upon uncollapse, the first grid members become transverse relative to the second grid members.

In an embodiment, each of the first elongate grid members may include a crease (e.g., a first crease) so that the creases of each of the first elongate grid members align with one another, so that the device is collapsible from opposed sides towards a crease line defined by the series of creases. Such a feature reduces the length of the charcoal igniting device when in a collapsed configuration. In another embodiment, another crease (e.g., a second crease) may be provided in the same first elongate grid members, spaced apart from the location of the first crease, to provide for an even more compact collapsed configuration. In an embodiment, the sets of creases may be disposed at an intersection of the first elongate member with a given one of the second elongate members (i.e., the crease line is actually a given one of the second elongate members).

Another aspect of the present disclosure is directed to a kit including a plurality of charcoal briquets and a combustible charcoal igniting device, such as any of those described herein.

Another aspect of the present disclosure is directed to a method for igniting a fire. Such a method may comprise providing a combustible igniting device, placing charcoal briquets or another combustible material (e.g., wood, etc.) above (e.g., on top of) the chimney cells of the cot bustible igniting device, and igniting the combustible igniting device to in turn ignite the charcoal briquets or other combustible material thereabove.

Further features and advantages of embodiments of the present disclosure will become apparent to those of ordinary skill in the art in view of the detailed description of preferred embodiments below.

BRIEF DESCRIPTION OF THE DRAWINGS

To further clarify the above and other advantages and features of the present disclosure, a more particular description will be rendered by reference to specific embodiments thereof which are illustrated in the drawings. It is appreciated that these drawings depict only typical embodiments and are therefore not to be considered limiting. Embodiments of the disclosure will be described and explained with additional specificity and detail through the use of the accompanying drawings in which:

FIG. 6A is a perspective view of another exemplary combustible charcoal igniting device having a fan-like configuration and including a securing band disposed over the collapsed device prior to its expansion for use;

FIG. 6B is a perspective view of the combustible charcoal igniting device of FIG. 6A, in which the securing band has been removed, and the device begins to be expanded;

FIG. 6C is a perspective view of the combustible charcoal igniting device of FIG. 6A, expanded further than in FIG. 69;

FIG. 6D is a perspective view of the combustible charcoal igniting device of FIG. 6A, expanded further than in FIG. 6C;

DETAILED DESCRIPTION OF THE PREFERRED EMBODIMENTS

I. Definitions

Figure 1:
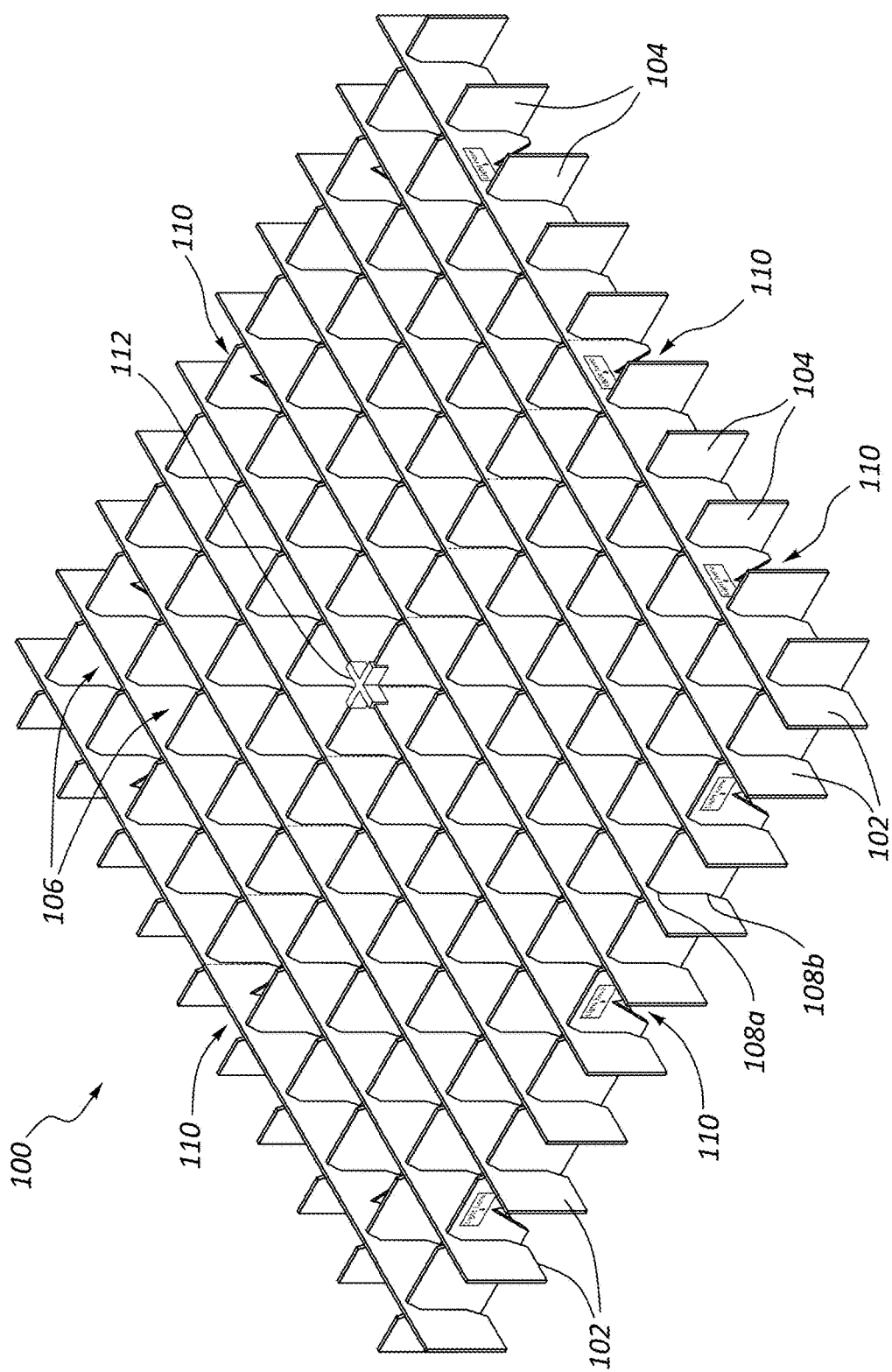
FIG. 1 is a perspective view of an exemplary combustible charcoal igniting device.

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel. characteristic(s)" of the claimed invention.

The term "consisting of" as used herein, excludes any element, step, or ingredient not specified in the claim.

It must be noted that, as used in this specification and the appended claims, the singular forms "a," "an" and "the" include plural referents Curless the content clearly dictates otherwise. Thus, for example, reference to a "surfactant" includes one, two or more surfactants.

Unless otherwise stated, any percentages, ratios, parts, and amounts used and described herein are by weight. In the application, effective amounts are generally those amounts listed as the ranges or levels of ingredients in the descriptions, which follow hereto. All measurements are in SI units, unless otherwise specified.

Some ranges may be disclosed herein. Additional ranges may be defined between any values disclosed herein as being exemplary of a particular parameter. All such ranges are contemplated and within the scope of the present disclosure. It should be understood that every limit given throughout this specification will include every lower, or higher limit, as the case may be, as if such lower or higher limit was expressly written herein. Every range given throughout this specification will include every narrower range that falls within such broader range, as if such narrower ranges were all expressly written herein.

For purposes of description, any directional references may typically be provided relative to the top of the device, which is where the user would place the source of charcoal or other material to be ignited by the device.

Numbers, percentages, ratios, or other values stated herein may include that value, and also other values that are about or approximately the stated value, as would be appreciated by one of ordinary skill in the art. A stated value should therefore be interpreted broadly enough to encompass values that are at least close enough to the stated value to perform a desired function or achieve a desired result, and/or values that round to the stated value. The stated values include at least the variation to be expected in a typical manufacturing or formulation process, and may include values that are within 10%, within 5%, within 1%, etc. of a stated value. Furthermore, the terms "substantially", "similarly", "about" or "approximately" as used herein represent an amount or state close to the stated amount or state that still performs a desired function or achieves a desired result. For example, the term "substantially" "about" or "approximately" may refer to an amount that is within 10% of, within 5% of, or within 1% of, a stated amount or value.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

II Introduction

In an aspect, the present invention is directed to a combustible device for igniting charcoal briquets or other combustible a which device is collapsible. The combustible device may include first and second pluralities of elongate grid members where when assembled and in an uncollapsed configuration, the first grid members are generally parallel with one another, and the second grid members are generally parallel with one another, but transverse (e.g., perpendicular) to the first grid members. In this way, the first and second grid members define a plurality of chimney cells as a result of the intersecting first and second elongate grid members. A combustible material, such as charcoal briquets may be placed above or on the chimney cells, and be ignited by igniting the first and second grid members.

The chimney cells created by the elongate grid members may be collapsed to streamline and reduce the size or profile of the device. To facilitate relatively more compact collapse, the first elongate grid members may be creased at a desired location (e.g., at their intersection with one of the second grid members). Such creases in one set of grid members allows the device to be collapsed from opposing sides toward a crease line defined by the creases (e.g., towards the center of the device). Collapse about the series of creases decreases the length of the collapsed combustible device, as compared to collapse where no such creases are provided, providing improved storage, packaging, transportation, etc.

Kits including a plurality of charcoal briquets and a charcoal igniting device as described herein may also be provided. For example, the device may be packaged with a unit dose or larger bag of charcoal briquets, for use therewith. The device could be placed within the bag, attached to a panel of the bag, etc. Instructions could be provided to place the briquets on or over the device (e.g., with a grate therebetween), and ignite the device under the charcoal.

III. Exemplary Combustible Charcoal Igniting Devices and Methods

FIG. 1 shows an exemplary combustible charcoal igniting device 100 in an uncollapsed configuration. Illustrated device 100 is shown as including a plurality of first elongate grid members 102 where each of the grid members 102 is generally parallel to one another when the device 100 is in its uncollapsed configuration. Illustrated device 100 is shown as further including a plurality of second elongate grid members 104 where each of the grid members 104 is generally parallel to one another and transverse relative to (e.g., perpendicular to) the first elongate grid members 102 when the device 100 is uncollapsed. The first elongate grid members 102 and second elongate grid members 104 may define a plurality of chimney cells 106 above or on which a plurality of charcoal briquets may be placed for ignition when the combustible charcoal igniting device 100 is in its uncollapsed configuration.

The device 100 may be collapsible. For example, the first elongate grid members 102 may be configured to collapse from the uncollapsed configuration in which the first elongate grid members 102 are transverse relative to the second elongate grid members 104 to a collapsed configuration in which the first elongate grid members 102 and second elongate grid members 104 are generally parallel to one another (e.g., see FIG. 3). Such a collapsed configuration greatly reduces the volume occupied by the device 100, e.g., it may be in the form of a collapsed relatively thin strip (thin relative to the uncollapsed square or rectangle, or other shape) in which the grid members 102, 104 are generally parallel when collapsed, and upon uncollapse, the first grid members 102 become transverse relative to the second grid members 104.

The first and second elongate grid members 102, 104 of device 100 may be formed from a combustible material that can be ignited and that will continue to burn, igniting charcoal briquets or other material placed above or on the chimney cells 106. Suitable construction materials may include, but are not limited to, cellulose-based natural materials derived from wood or wood products, including paper, paperboard, cardboard, cardstock, wood fiber, wood chips, wood pulp, sawdust, lightweight particle board, compressed recycled paper, or similar materials. Vegetable fibers, pulp and recycled materials of plant origin may also be used. Suitable materials may typically be in the form of a sheet of material that is subsequently formed, cut, stamped, die-cut, pressed or otherwise sized or shaped to the desired shape, length, thickness, surface finish, density, rigidity, etc. In an embodiment, the outer elongate grid members of the device 100 may be constructed from lighter grade, thinner, more easily ignited material, while the inner elongate grid members (or portions thereof) may be of heavier stock, with higher BTU and/or burn temperature so the combination provides relatively easier ignition, with more prolonged higher heat production as the device burns.

In an embodiment, the plurality of chimney cells 106 formed by the elongate grid members 102, 104 are created by interlocking the first and second elongate grid members 102 and 104 with one another. For example, each first elongate grid member 102 may interlock with a plurality of second elongate grid members 104, and each second elongate grid member 104 may in turn interlock with a plurality of first elongate grid members 102. The interlocking grid members may be engaged with one another such that the device 100 may be collapsed and expanded without disengaging or otherwise separating the grid members from one another.

In an embodiment, the interlocking grid members may form a substantially planar top surface when the combustible charcoal igniting device 100 is in its uncollapsed configuration. For example, device 100 may be formed from first and second elongate grid members 102, 104 of the same or substantially the same height, and the various grid members may be interlocked with one another so that the height of device 100 may be substantially the same as the height of any individual grid member. In another embodiment, the various grid members could include varying or different heights. For example, the device could include a greater height towards its center, and relatively shorter height towards the perimeter edges. Such may aid in distributing charcoal briquets poured onto the device so as to have more uniform thickness, rather than the pile being thicker near its center.

Interlocking of the first and second grid members may be facilitated by notching, cutting, or otherwise providing slots 108a in top edges of one set of grid members, while providing corresponding slots 108b in bottom edges of the other set of grid members. While termed a "slot", it will be appreciated that a cut, slit, notch, or similar structure could be used. For purposes of simplicity, all such structures which aid in interlocking the grid members together will be collectively referred to herein as slots. Spacing of the slots 108a (and 108b) along any given grid member may be provided so as to be at the point of intersection with the other oriented grid members, as shown in FIG. 1.

Furthermore, as shown in FIG. 1, one or both slots 108a, 108b may be flared at their open ends, to better facilitate insertion of the other grid member (and other slot) therein. For example, in the illustrated device 100, grid members 104 each include a plurality of slots 108b formed in a top edge thereof, which are flared at their open top. Similarly, the slots 108a formed in a bottom edge in grid members 102 are also flared at their open ends, so that when the open flared ends of slots 108a and 108b are brought together, they may facilitate easier insertion of grid members 102 down into the slots 108b of grid members 104. Aside from such flared ends, the slots 108a and 108b may be more than mere cuts (e.g., with no real width), but may include a width associated with the slot, to better accommodate the passage of the other grid member therethrough. In an embodiment, either or both of slots 108a, 108b may have a width approximately equal to the thickness of the grid member being received therein.

In an embodiment, the plurality of chimney cells 106 have length and width dimensions such that when charcoal briquets are dumped or otherwise placed on the top surface of device 100, the briquets rest on top of the chimney cells, rather than falling therein. For example, the length and/or width of cells 106 may be smaller than the briquet dimensions the device is provided with, or used with. For example, typical charcoal briquets may be about 1.75 inches in width and length, with a depth of about 1 inch. Of course, other briquet sizes, shapes, etc. may also be used. By way of non-limiting example, the dimensions of chimney cells 106 may be from about 1 to about 1.5 inches in width and length. The cells may be square, or approximately square. Other shapes are of course also possible. The above described dimensions are sufficiently small to prevent standard sized charcoal briquets poured, dumped, or otherwise placed on the top surface of device 100 from falling into the cells 106. Rather, the charcoal briquets will remain on top of the cells 106, supported by the criss-crossed grid members 102 and 104. Larger sized cells could be used while still preventing the briquets from falling therein by placing the device below a grill grate, and placing the briquets on the grate, above the device.

The chimney cells 106 advantageously allow air to come up from the bottom of device 100 and more uniformly light the charcoal, as compared to a simple pile of charcoal alone. The presence of such chimney cells 106 avoids the staged lighting that typically occurs when using a standard charcoal chimney(see FIG. 7), or when just lighting a pile of charcoal briquets soaked in lighter fluid. For example, in a charcoal chimney, the briquets on the bottom become hot and ready to use the fastest with a gradual decrease in briquet readiness from bottom to top. Chimneys cells 106 may aid in directly conveying heat onto the briquets. This heat transfer mechanism also differs from that of burning lighter fluid. For example, when lighter fluid is used to start briquets, it is the actual lighter fluid vapor that is ignited above the briquets, which burning vapor must be hot enough to transfer sufficient heat to the briquets, in order to ignite them. As described below, the inventors have undertaken some comparative testing, illustrating how use of the present charcoal igniting devices can actually result in as fast, or faster lighting of the charcoal briquets as compared to various available alternatives (e.g., such as lighter fluid, a charcoal chimney, etc), and advantageously, without the use of any lighter fluid.

As shown in FIG. 1, one or more of grid members 102 and 104 may include one or more ignition aid notches 110 formed therein. For example, any of the grid members 102 or 104 defining the outer perimeter of device 100 may include such an ignition aid notch 110. Such notches 110 could also be positioned within the interior grid members, although placement in the perimeter grid members may be advantageous for easier lighting access by the user.

As shown in FIG. 1, in an embodiment, ignition aid notches 110 may be triangular-shaped notches cut out of the base of elongate grid members 102, 104, although other shapes or configurations are also possible. As such, the term notch as used in reference to the ignition aid notches 110 is to be broadly construed, to generally include any shape, whether cut (e.g., die cut), punched, or otherwise formed within elongate grid members 102 or 104 which facilitates insertion of a lit match or other fire starter. For example, notches 110 could be in the shape of a circle, polygon, another closed or open shape formed of lines or curves, etc. While illustrated with the notches 110 extending to the bottom of the grid members 102, 104, it will be appreciated that they could be formed within the interior of the grid members (e.g., a closed shape within the grid member).

In an embodiment, ignition aid notches 110 may also be disposed along the elongate grid members 102 and 104 such that there is at least one notch 110 along each side or end. The illustrated embodiment shows 3 ignition aid notches along each side and end of the square or rectangular perimeter of device 100. The notches 110 may be approximately evenly spaced apart from one another along any given side or end, as shown, or may be provided with other spacing (e.g., only near the corners, or only at the center of each side or end).

The illustrated triangular shaped cut-out notches 110 open at the bottom may be particularly suitable as being inexpensive to manufacture, and quite effective, although it will be appreciated that a hole or other pattern cut out or otherwise formed in elongate grid members 102 and/or 104 by die cutting or other mechanism may be used. In other examples, the ignition aid notches 110 may be simple circular holes cut or punched out of grid members 102 and/or 104, or a multi-pointed star or starburst pattern. Regardless of the geometry of notches 110, the edges of the notches 110 may be roughened (e.g., creating a "fuzzy" edge), slitted, fibrillated, thinned, or otherwise altered to create surfaces that are more easily ignited.

A material that is more combustible than the underlying paperboard or other material of grid members 102, 104 may be provided on, over, or next to notches 110. For example, paper, particularly wax paper, or other easily combustible material may be provided covering at least a portion of the ignition aid notches 110, or adjacent thereto. The easily combustible material may be ignited to assist in lighting the ignition aid notch and associated elongate grid member. In an embodiment, notches 110 may be coated or covered with a flame propagation agent and/or an ignition accelerant (e.g., wax, oil, or another readily combustible material that will not readily volatilize away during storage). In an embodiment, laminated backing paper (e.g., wax paper) may be provided over an entire span, or at least a portion of the span, of one or more elongate grid members 102, 104 (e.g., the four outer perimeter grid members).

In an embodiment, the ignition aid notches 110, other portions of elongate grid members 102, 104, or any applied wax, wax paper, or other flame propagation agent or ignition accelerant may include a scent (e.g., scented oil). For example, mesquite or other scented paper, wax, or other material may be included at or near lighting notches 110 so that as this material burns,the user experiences the desired scent (e.g., burning mesquite, hickory, etc). Any desired scent or flavor, particularly those common to barbeque and/or the culinary field such as hickory, mesquite, BBQ, thyme, smoke, cherry, maple, apple, oak, pecan, alder, or the like may be used.

In an embodiment, ignition aid notches 110 may also act as air vents to increase air flow into device 100. The ignition aid notches 110 acting as air vents may be disposed on the outer perimeter elongate grid members 102, 104, although it will be appreciated that additional notches 110 could be provided on the centrally disposed internal grid members 102 and/or 104 to provide additional possible lighting areas and/or to increase air flow towards the interior of the device.

As shown in FIG. 1, in association with any such ignition aid notches, "light here" or similar indicia (e.g., a picture of a lit match) could be provided above, to the side, or otherwise near the ignition aid notches, to direct lighting of the device by the user. In an embodiment, one or more matches could be provided with the device. For example, a removable match could be provided, frictionally coupled to a strike region (a phosphor region as on a match box), which could enable lighting of the device (e.g., at a notch 110) by simply pulling the match.

In an embodiment, for example as depicted in FIG. 1, the combustible charcoal igniting device 100 may include a securing element 112 to maintain the device in its uncollapsed configuration. As shown in FIG. 1, the securing element 112 may comprise any structure that engages with the elongate grid members 102, 104, with chimney cells 106, or both, in order to maintain them in the appropriate uncollapsed orientation, for lighting. FIG. 1 illustrates an exemplary securing element 112 as comprising a rigid cross piece that may be place over an intersection between a first elongate grid member 102 and a second elongate grid member 104, helping to maintain them in the desired substantially transverse (e.g., perpendicular) orientation. While securing element 112 is shown as spanning just one intersection, it will be appreciated that the securing element 112 could be longer along one or both arms, so as to span more than one intersection. In addition, more than one securing element could be employed, positioned at any desired locations about device 100. Where a single securing element 112 is used, it may be placed at or near the center of the device 100, In another embodiment, the securing element could include one or more structures having the shape of the interior of the chimney cells, so as to be tightly inserted into one or more of the chimney cells 106. Such a configuration would aid in maintaining the device 100 in an uncollapsed configuration, similar to illustrated securing element 112. For example, a securing element could include two such shapes that could be connected together at corners, vertices or otherwise, such that the securing element is insertable into two (e.g., adjacent) chimney cells 106 simultaneously. In another embodiment, the securing element may not necessarily be the same shape as the interior of the chimney cell, but still configured to hold it fully open, or expanded. For example, a circular and/or cylindrical securing element could be inserted into a chimney cell 106 to bear against the four sidewalls thereof, holding the chimney cell (and thus the device 100) in a substantially uncollapsed configuration.

In an embodiment, the securing element 112 may comprise a combustible material, such that the burning of the combustible charcoal igniting device 100 will cause the eventual ignition and burning of securing element 112. For example, the securing element may be formed from the same or similar material as the elongate grid members 102, 104 (e.g., paperboard). In an alternative embodiment, the securing element 112 could be constructed of a noncombustible material (e.g., metal). It may be possible to reuse such a noncombustible securing element when igniting another device 100.

Figure 2:
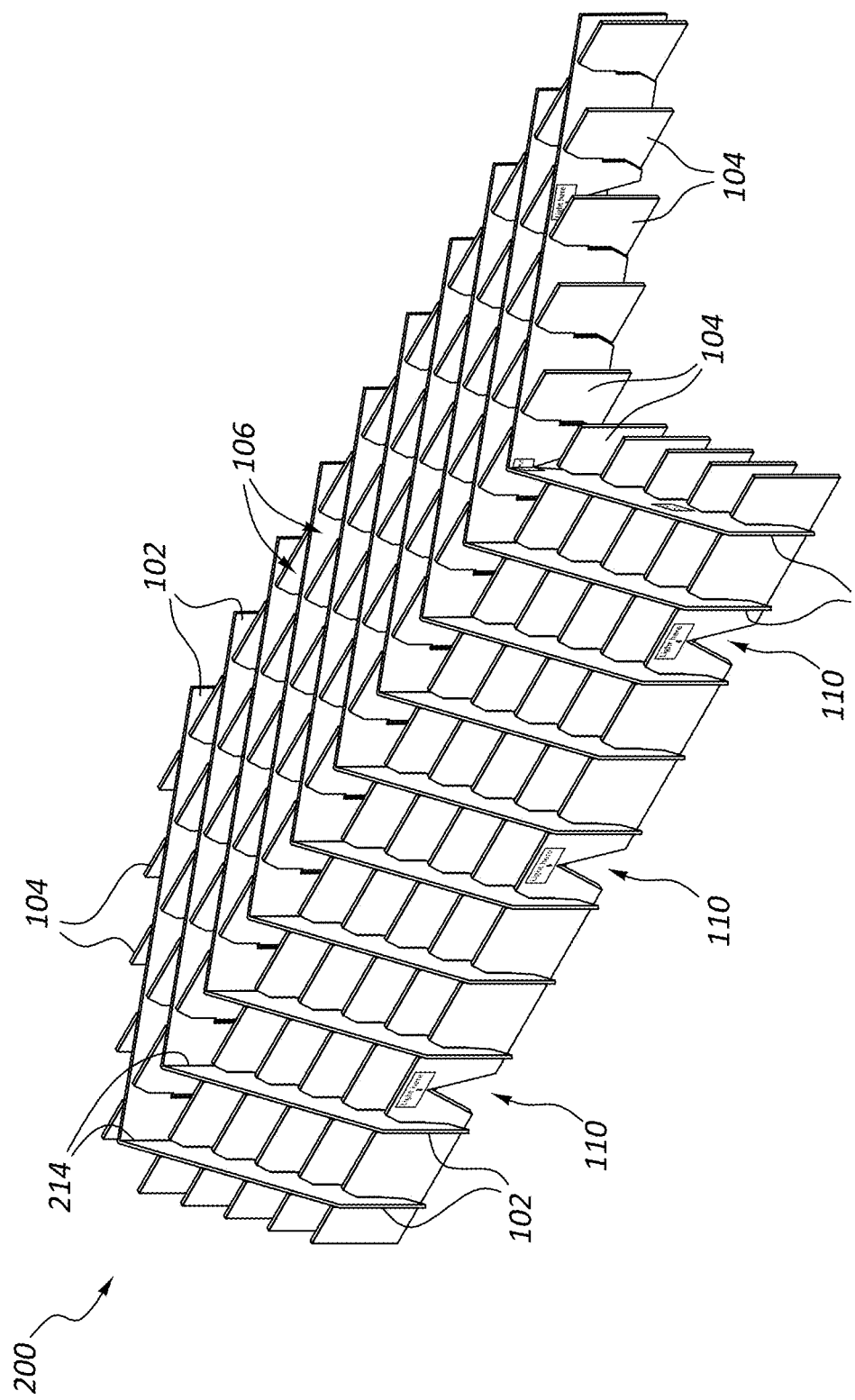
FIG. 2 is a perspective view of a charcoal igniting device similar to that of FIG. 1, showing the charcoal igniting device partially collapsed about a crease or fold line so as to assume a V-shaped configuration.

FIG. 2 illustrates how the combustible charcoal devices may include one or more aligned creases which serve to reduce the length of the overall device once collapsed. For example, FIG. 2 shows a device 200 otherwise similar to device 100 of FIG. 1, but in which each of the first elongate grid members 102 include a crease 214 so that the creases 214 of each of the first elongate grid members 102 align with one another, forming a crease line along which the device 200 may be collapsed from either side, towards the crease line. Such creases 214 enable the device 200 to be collapsed from opposed sides towards the crease line, which may be at or near a center of the device 200. In an embodiment, the creases 214 defining the crease line may be in each first grid member 102 at the intersection with a given one of the second elongate grid members, such that the given second elongate grid member becomes the crease line along which the device 200 is collapsible inclusion of such aligned creases reduces the length of the device 200 when in its collapsed configuration, as compared to its collapsed length where no such creases are present.

For example, when a grid-style device as seen in FIG. 1 is collapsed, the first or second grid members simply pivot about an axis from the generally perpendicular orientation seen in FIG. 1, to an essentially 0 degree, generally parallel orientation. For example, when collapsing the device of FIG. 1, the second grid members 104 may pivot from generally vertical (if initially so oriented), towards the horizontal, while the first grid members 102 may remain generally horizontal throughout the collapse. Without any creases to reduce the collapsed length, the device 100 may have a collapsed length that is approximately equal to 1.9 times the length of the longest side (or either side, where the device is square).

With a series of aligned creases 214, as in device 200, the collapsed length is significantly shorter than 1.9 times the length of the longest side. This is advantageous, as the longer length is often difficult to accommodate on or within a charcoal bag, as the device is contemplated to be provided packaged with such a bag of charcoal. Placement of creases 214 at or near a center of the device (e.g., at or between the $5^{th}$ or $6^{th}$ elongate member where a given side or end includes 10 grid members) may decrease the length to about 1.4 to 1.5 times the initial length.

Figure 3:
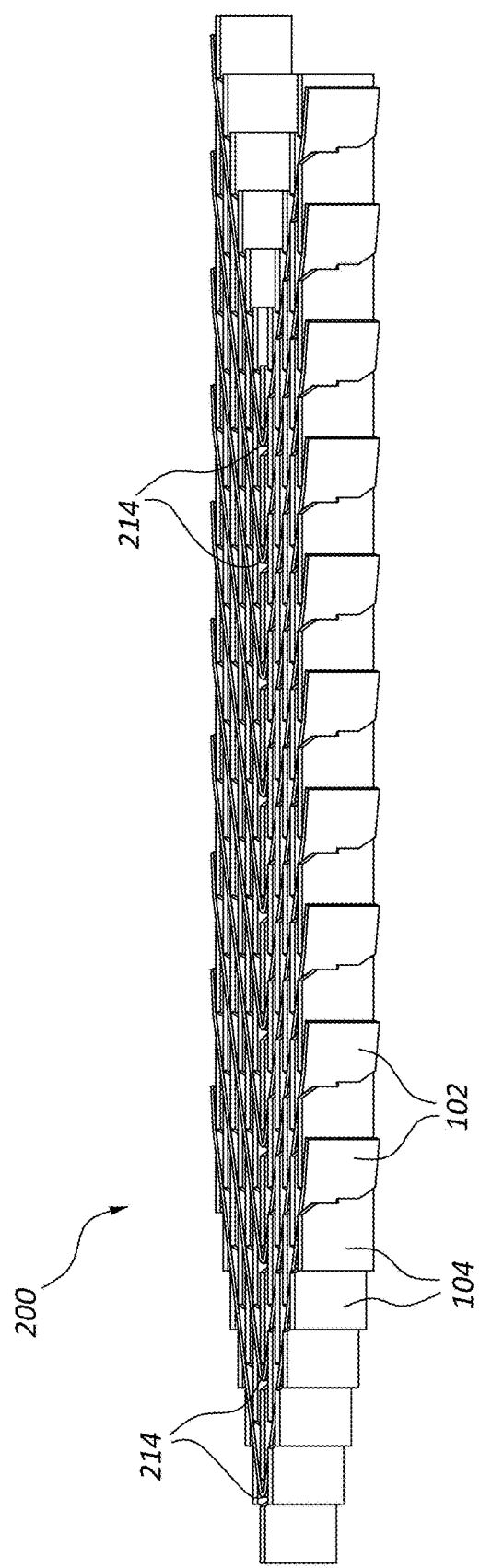
FIG. 3 is a perspective view of the combustible charcoal igniting device of FIG. 2, shown more fully collapsed.

Inclusion of one such series of aligned creases results in a V-shape as the device 200 is collapsed about crease line 214, as seen in FIG. 2. FIG. 2 shows device 200 partially collapsed, illustrating how a V-shaped collapsed configuration will result upon full collapse. FIG. 3 shows device 200 nearly fully collapsed. While the total length of collapsed device 200 may still be longer than the longest elongate grid member, it will be significantly less than 1.9 times the length of the longest grid member.

It will be appreciated that any distinction between first elongate grid members 102 and second elongate grid members 104 may be somewhat arbitrary, as the device may be rotated, flipped, etc., to assume a different orientation or position. While various features, (such as creases 214) are shown as being formed within first elongate grid members 102, they could alternatively be formed in second elongate grid members 104. In another embodiment, it may be possible to form any such structures in both, e.g., creases in both may allow the device to be collapsed along either crease line.

Figure 4:
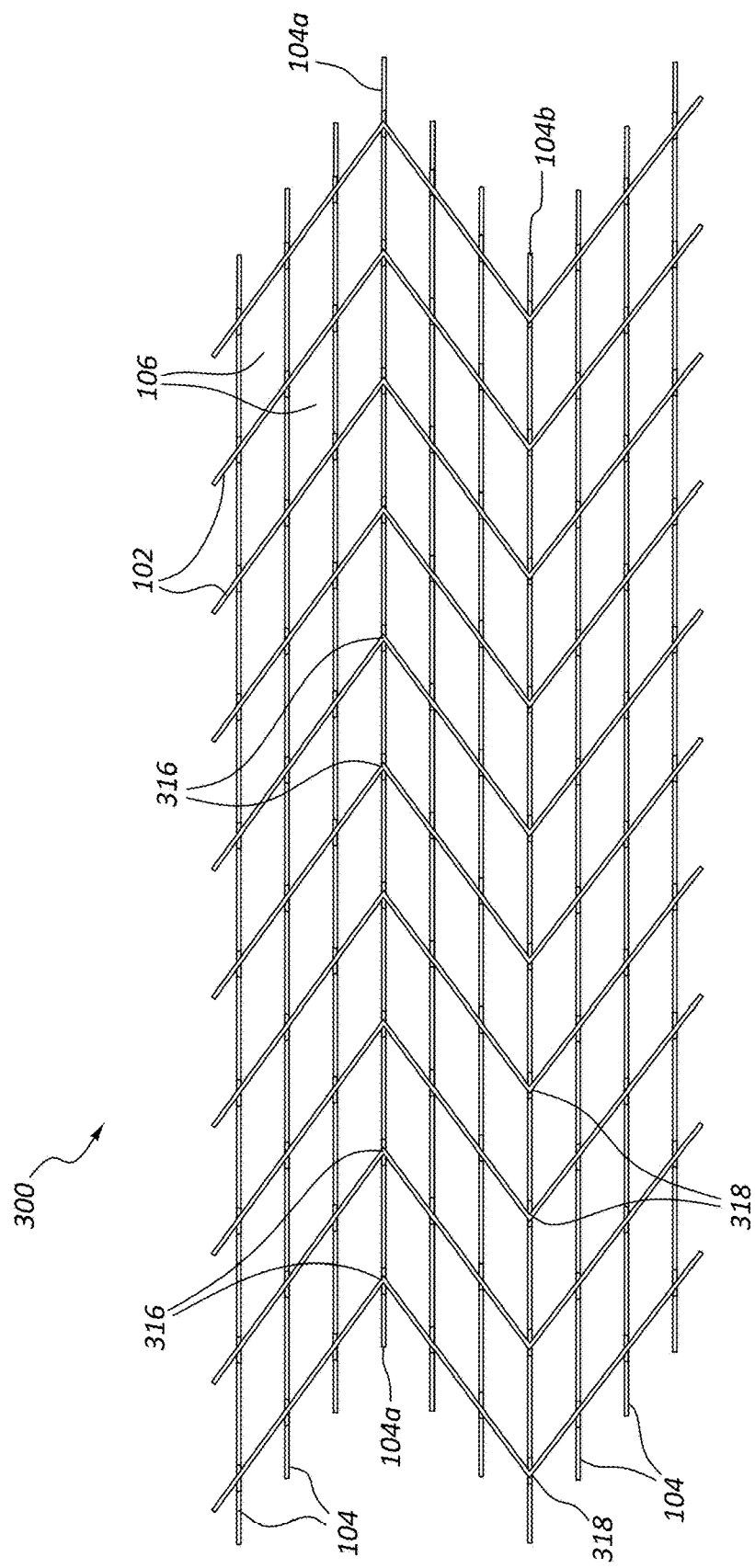
FIG. 4 is a schematic view of another exemplary combustible charcoal igniting device, including two spaced apart series of creases to define two crease lines to allow the device to collapse to a more compact configuration.

The combustible charcoal igniting device may include more than one crease line, e.g., a plurality of crease lines that are parallel to one another may be provided. FIG. 4 schematically shows a top plan view of a charcoal igniting device 300 including two such crease lines 316 and 318, and which is partially collapsed about the crease lines to better illustrate their presence. In the illustrated embodiment, creases 316 in first elongate grid members 102 are shown as being aligned with an intersection of a given one of the second grid members (e.g., $4^{th}$ second grid member 104a). Creases 318 in grid members 102 are shown as being aligned with an intersection of another second grid member (e.g., $7^{th}$ second grid member 104b). As a result, device 300 is able to fold about both intersected grid members 104a and 104b, in a zig-zag, alternating direction, resulting is an even greater reduction in width as device 300 is collapsed from opposing ends towards crease lines defined by creases 316 and 318, towards the center of device 300.

While illustrated with placement of creases 316 and 318 at the intersection of a given crossing grid member (i.e., one of grid members 104—specifically grid members 104a and 104b), it will be appreciated that one or both sets of the creases 316, 318 could alternatively be positioned between intersecting grid members, as creases 214 in the embodiment shown in FIG. 2.

Figure 5:
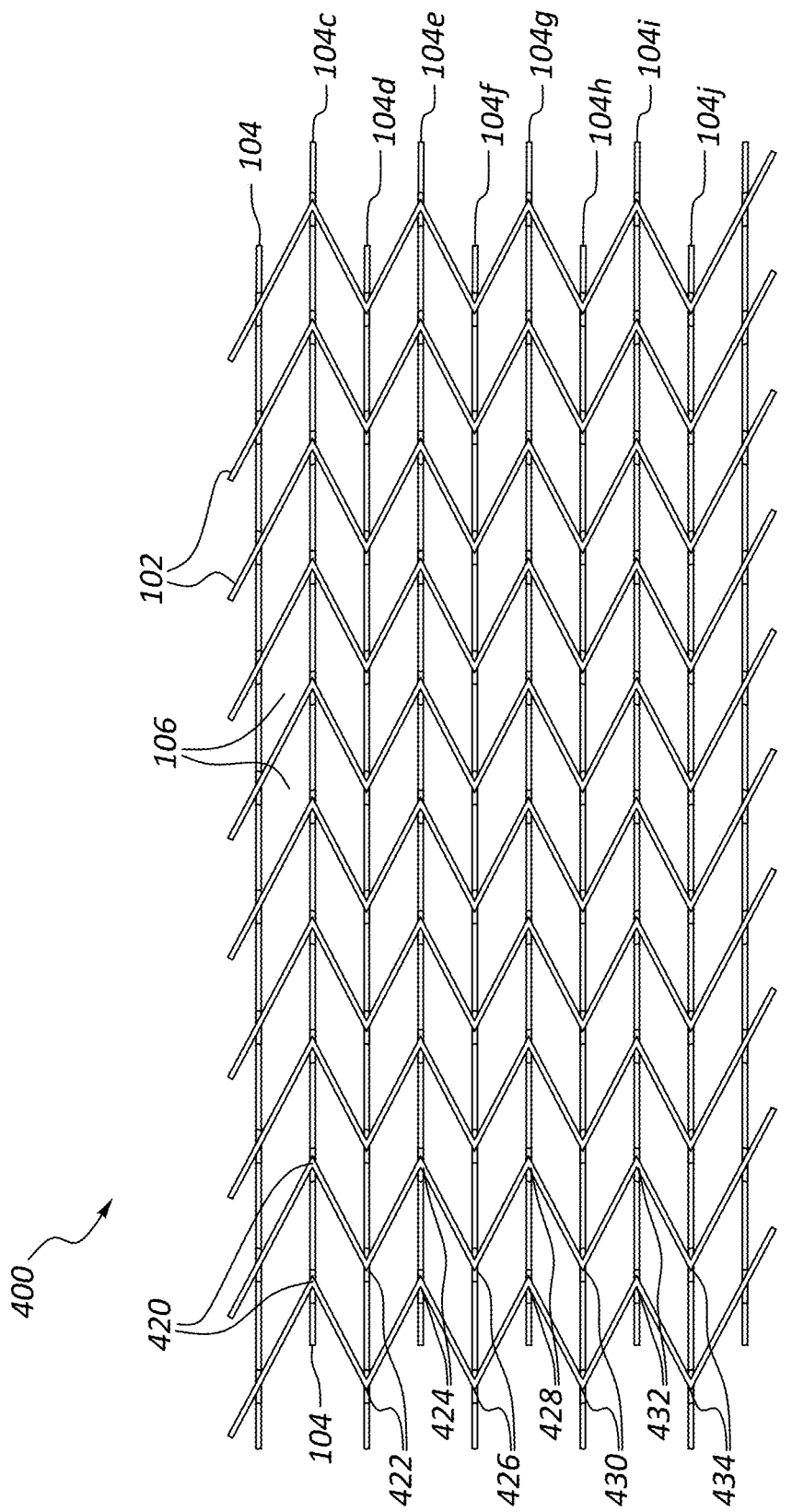
FIG. 5 is a schematic view of another exemplary combustible charcoal igniting device, which includes a hyper-folded configuration, where each first elongate grid member is creased in alternating directions at each successive intersection across the centrally disposed second elongate grid members, which allows the device to collapse in a more compact configuration.

FIG. 5 shows a hyperfolded configuration of a device 400, where a crease is provided at each intersection of elongate grid member 102 with each successive grid member 104, within the central section of device 400. For example, creases 420 are shown at the intersection of each first elongate grid member 102 with the $2^{nd}$ second elongate grid member 104c. Creases 422 are shown at the intersection of each first elongate grid member 102 with the $3^{rd}$ second elongate grid member 104d. Creases 424 are shown at the intersection of each first elongate grid member 102 with the $4^{th}$ second elongate grid member 104e. Creases 426, 428, 430, 432, and 434 are similarly provided at the intersection with second elongate grid members 104f, 104g, 104h, 104i, and 104j, respectively. No creases are shown at the intersection with the outer perimeter second elongate members 104 (those at the sides or ends), although such could be provided, if desired. The direction of the creases is alternated sequentially along the first elongate grid members 102, resulting in the first grid members assuming a zig-zag configuration as they are collapsed. Such a configuration includes many (e.g., 8 are illustrated) crease lines, and therefore will have a collapsed length associated with device 400 that is shorter than that of the embodiments shown in FIGS. 2, 3, and 4. For example, the collapsed length will be significantly less than 1.9 times the length of the longest grid member. For example, such a hyperfolded configuration may result in a collapsed length that is only about 15-20% (e.g., 16%) greater than the length of the longest elongate member.

FIG. 5 shows columns (i.e., distance between adjacent crease lines) of one chimney cell 106 wide that collapse towards a given second elongate grid member 104, whereas FIG. 4 shows columns that are three chimney cells 106 wide that collapse towards a given second elongate grid member 104a and/or 104b. It should be appreciated that the illustrated embodiments are examples only and other configurations will be apparent to one of skill in the d are encompassed within the scope of the invention.

Figure 6F:
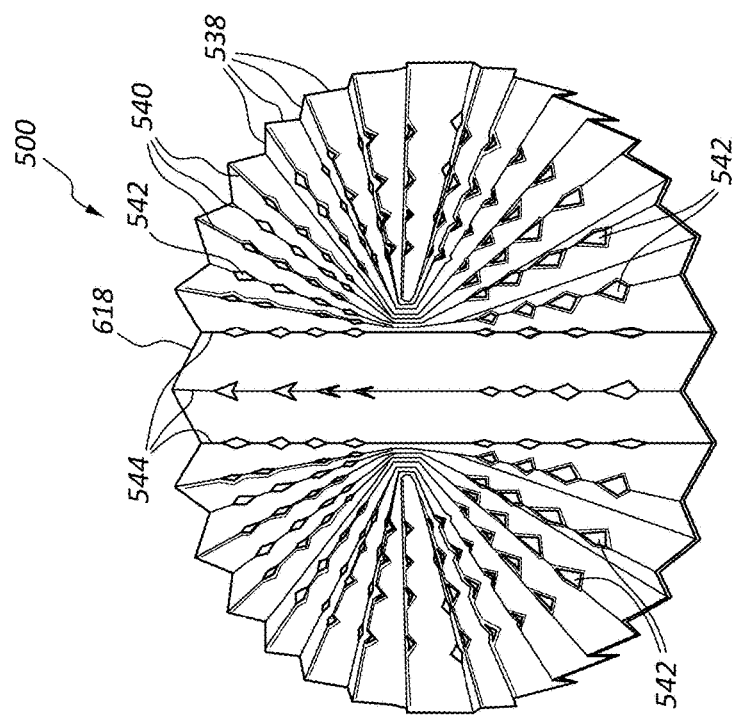
FIG. 6F is a perspective view of the combustible charcoal igniting device of FIG. 6A, in which the left and right ends are beginning to be further expanded away from one another, to result in an oval profile.

FIGS. 6A-6F illustrate progressive opening of a combustible charcoal igniting device with a different, fan-like, hyperfolded accordion configuration. As shown in FIG. 6A, the combustible charcoal igniting device 500 is fully collapsed and retained in that collapsed configuration by a securing band 534. The securing band 534 may be made of any material sufficient to maintain the device 500 in a substantially collapsed and folded configuration. This may include, for example, a paper band, a rubber band, and/or a band made from any other suitable material. As folded in FIG. 6A, device 500 includes a crease 536 resulting from the elongate members of the fan-like device being folded over itself once the various elongate members are already collapsed to be against one another, and generally parallel relative to one another.

As seen in FIGS. 6A-6F, device 500 may similarly include a plurality of elongate members 538, attached to one another along edges or sides 540 of the elongate grid members in an expandable fan-like accordion configuration. As seen in the Figures, the top and bottom edges 540 where one member 538 joins another member 538 may simply be a crease therebetween. As a result of such alternating top and bottom creases 540, an accordion folded structure results, which allows the elongate members 538 to extend upright when placed on a horizontal surface, such as a grill, as will be apparent from FIGS. 6E and 6F.

Along one or more of the creases 540, chimney cells 542 may be provided. In the illustrated configuration, cells 542 may simply be cut-outs within the top and/or bottom creases 540. Such chimney cells formed within the elongate members 538 allow combustion air to be introduced to charcoal briquets that may be placed on the top surface of the elongate grid members, for ignition. Because the elongate members 538 are generally upright, an air cavity will be disposed below chimney cells 542, allowing air to be drawn from the outer perimeter, under alternating V-shaped accordion elongate members, and up through cells 542, to aid in igniting charcoal briquets placed on the top surface of device 500.

As the other embodiments described herein, the elongate members 538 may be formed from a combustible material paperboard) that can be ignited and that will continue to burn, igniting charcoal briquets placed on a top surface of the elongate members. Spacing between adjacent top surface creased edges 540 may be dimensioned as described above to support a standard (or other sized) sized charcoal briquet thereon, supported between the adjacent high point edges.

Figure 6E:
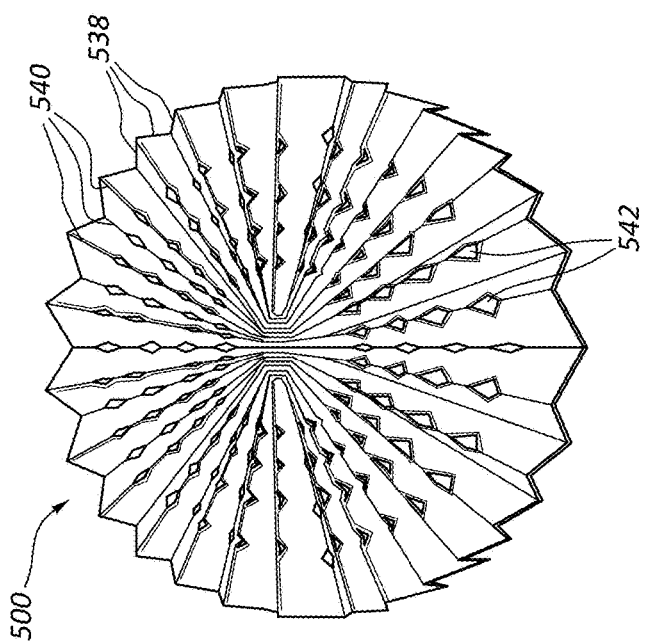
FIG. 6E is a perspective view of the combustible charcoal igniting device of FIG. 6A, expanded to a generally circular profile.

FIG. 6E illustrates device 500 in a configuration where it has been sufficiently expanded to assume a generally circular shape. It will be readily apparent that a plurality of charcoal briquets or other combustible material could be positioned on the top surface of the generally circular device 500 of FIG. 6E, and ignited by igniting the device 500 (e.g., by igniting the outer circular perimeter, by igniting one or more of chimney cells 542, an outer perimeter edge, etc. The device 500 may be further expanded, as shown in FIG. 6F, pulling the opposed ends, to further unfold central creased edges 544, which may result in an oval configuration, as seen. Of course, the final shaped configuration may depend on the particular geometry of the various elongate members 538, creased edges 540, etc. Various other configurations will be apparent to one of skill in the art. A circular or oval configuration to the combustible charcoal igniting device may be particularly useful for a grill, firepit, or other fire holding apparatus that includes a corresponding circular or oval shape. While the devices of FIGS. 1-5 are shown as square or rectangular, they could similarly be trimmed to assume a circular, oval, or other shape, as desired. Various sizes could also be provided, to accommodate differently sized grills, etc.

Figure 7:
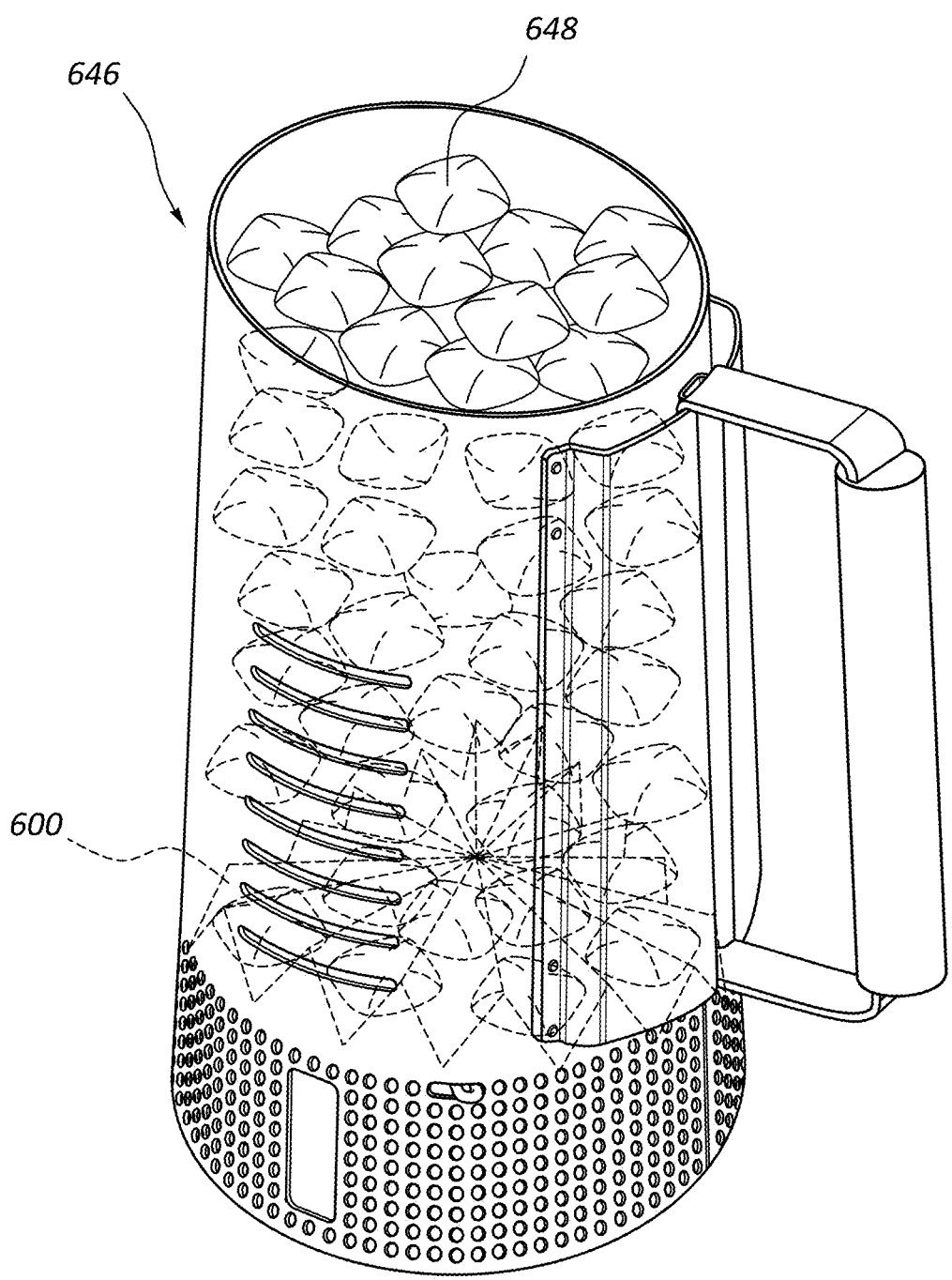
FIG. 7 is a perspective view showing how the charcoal igniting device can be received into the bottom portion of a charcoal chimney, for use in igniting charcoal within the charcoal chimney.

FIG. 7 shows how an embodiment of the combustible charcoal igniting device 600 could be configured for use within a charcoal chimney 646. Such a device 600 could be similar to any of those disclosed herein, e.g., an embodiment such as that seen in FIGS. 1-5 could be trimmed along the perimeter so as to have a circular perimeter so as to fit neatly within the circular cross-section of the charcoal chimney. A square or rectangular shaped device could similarly be used, with a width and length that would fit within the diameter of the charcoal chimney. Alternatively, a fan-like accordion folded configuration such as that of FIGS. 6A-6F could be inserted within the charcoal chimney. Other configurations employing a similar principal of providing elongate members that extend upright, and support charcoal briquets thereon could also be used, where the elongate members are ignited, to in turn ignite the charcoal 648.

In an embodiment, the combustible charcoal igniting device 600 may be in the shape of a truncated cone when in its uncollapsed configuration having a greater height at its center than perimeter. Similarly, any of the configurations described herein could include a greater height at their center than their perimeter. A center region of the device having a raised height which tapers to a lower height around the edges and/or sides may advantageously cause charcoal poured onto the bed to form a more uniformly thick bed of charcoal than occurs when one normally pours a pile of charcoal, which typically results in a pyramidal shape Which is thicker in the center.

In another embodiment, the heights of adjacent elongate grid members could be varied in height to create an orientation of the charcoal that is randomized during free-pouring. Such randomized orientation enables the charcoal to adopt a more compact, efficient random packing structure with higher fuel density on the surface of the device, aiding in more efficient ignition of the charcoal bed.

In an embodiment, the charcoal chimney 646 may be provided in a bottomless or near bottomless configuration (used interchangeably herein), so that if charcoal were placed within the charcoal chimney 646, it would fall through the open bottom of the chimney. By "near bottomless", it is meant that a portion of the bottom (e.g., adjacent the perimeter of the canister shaped chimney) may optionally include a bottom wall or grating, although any such bottom wall or grating does not extend inwardly to a sufficient distance to prevent falling of charcoal through such a plane. For example, any such portion may not cover the full bottom of the charcoal chimney. Rather, it may simply comprise a laterally inwardly extending, narrow, bottom flange, but may otherwise be open at the bottom, so that charcoal falls therethrough unless some structure is placed therein.

Figure 7A:
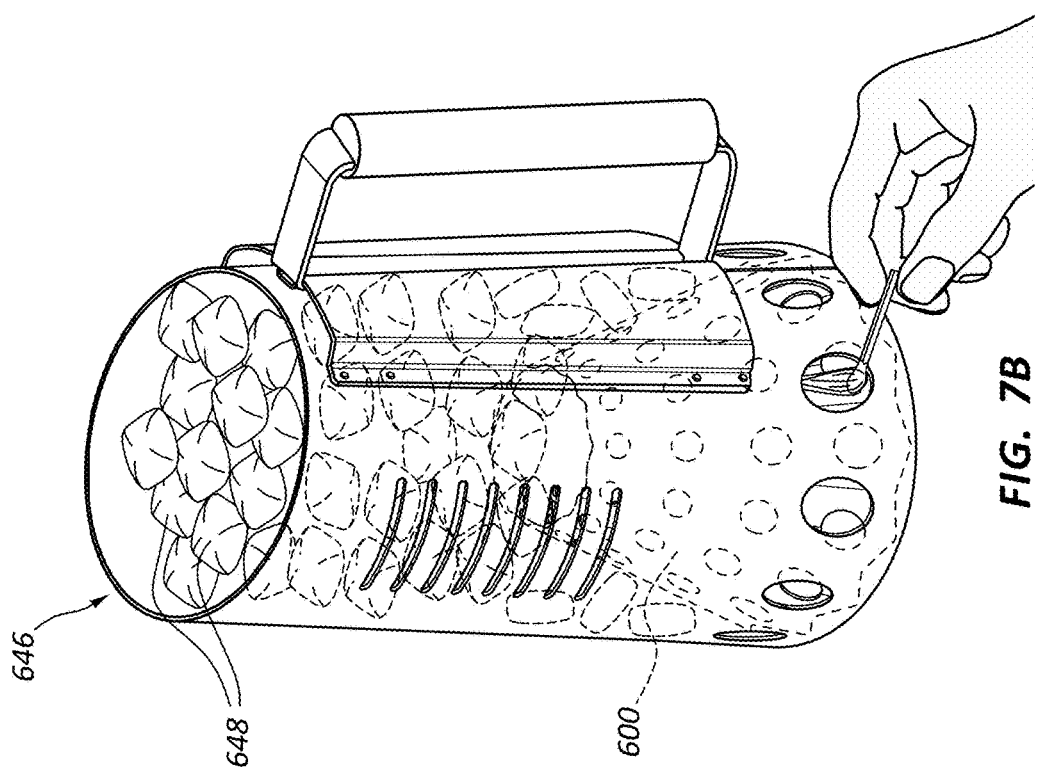
FIG. 7A is a perspective view showing a charcoal igniting device received into an otherwise bottomless chimney, allowing the charcoal, once ignited, to fall through the open bottom once the charcoal igniting device is consumed.
Figure 7B:
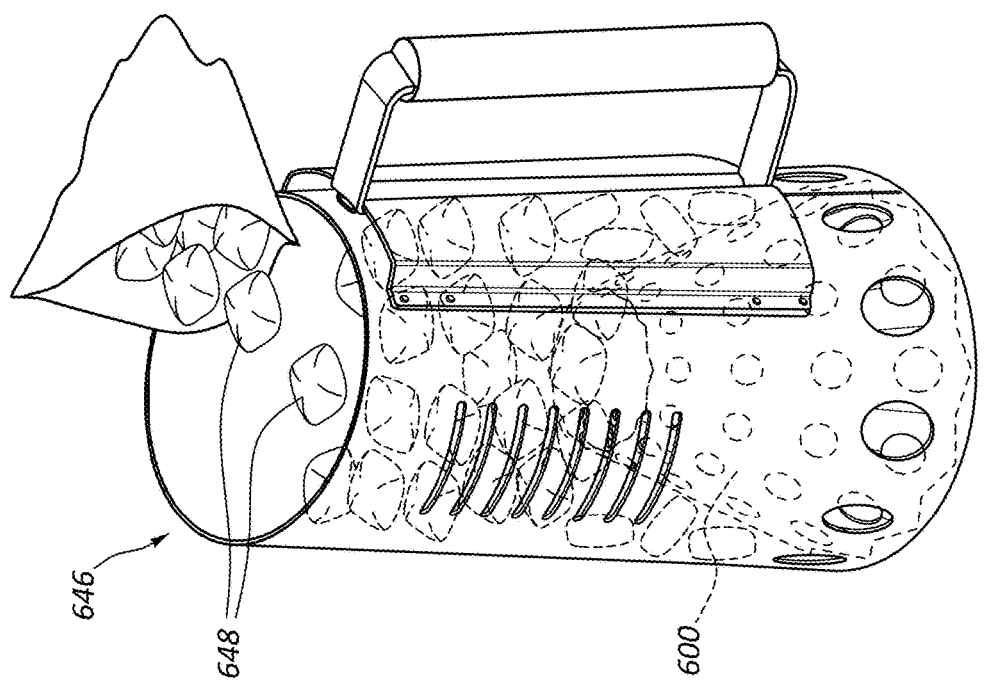
FIG. 7B illustrates a user lighting a charcoal igniting device in a charcoal chimney such as that of FIG. 7A.
Figure 7C:
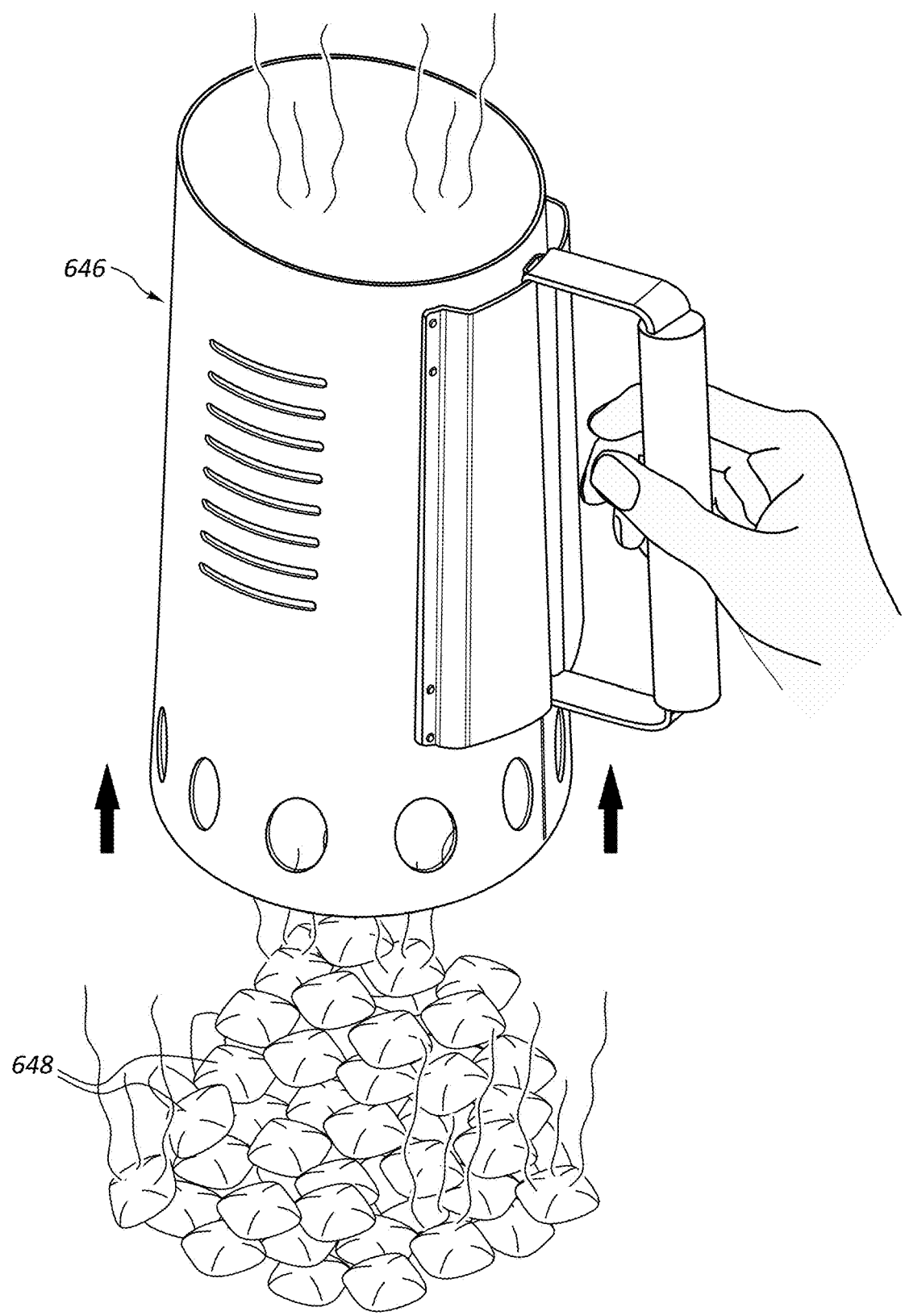
FIG. 7C illustrates a user lifting the charcoal chimney of FIG. 7B upwards, so that the hot charcoal falls out the open bottom, without requiring any inversion or tipping of the charcoal chimney.

FIGS. 7A-7C further illustrate such an embodiment, which may be used in conjunction with a combustible charcoal igniting device 600, which fits into the open bottom of charcoal chimney 646, initially closing the bottom, so long as the device 600 remains in place. As device 600 is combustible, once it burns away, the charcoal 648 positioned thereabove will fall under force of gravity, to the bottom of the charcoal chimney((e.g., resting on a barbeque grill grating or other similar surface on which the charcoal chimney is placed).

Such a bottomless charcoal chimney 646 provides several distinct advantages relative to existing charcoal chimneys. For example, where the device 600 is consumed, so as to no longer be capable of supporting the charcoal briquets, the hot charcoal may not need to be dumped out of the chimney by inverting the chimney to dump the coals therefrom. Rather, all that may be needed is for the user to simply lift the charcoal chimney (without tipping), and the hot coals simply remain where they've settled during ignition, or fall out the bottom of the charcoal chimney 646. It may be helpful to tap the charcoal chimney while so doing, to ensure all the hot charcoal falls through the open bottom, as the chimney is lifted. Such a system may be provided with one or more such combustible charcoal igniting devices, one of which can be inserted and retained within the bottom of the charcoal chimney during initial set up. Replacement combustible charcoal igniting devices configured for insertion into the chimney may also be provided, e.g., separate from the initially acquired chimney.

If desired, a lock and key retaining relationship between the insertable charcoal igniting device and the interior of the charcoal chimney may be provided. For example, slots in the sidewalls of chimney 646, or projections therefrom, may receive a complementary shaped portion of the insertable charcoal igniting device 600 (e.g., a projection fitting into a slot). Thus, a system may be provided including a bottomless charcoal chimney (e.g., formed of metal or another material that will not burn and be consumed during use), in combination with a combustible charcoal igniting device that temporarily serves as a bottom to the charcoal chimney, holding the charcoal therein during initial set up and through ignition of the charcoal. Because such a charcoal chimney does not require a permanent non-cumbustible bottom member, such a chimney is significantly less expensive than existing charcoal chimneys (e.g., approximately half the cost). For example, existing chimney designs typically include a bottom member (e.g., a bottom wall or grating) that is welded or otherwise attached to the sidewall of the chimney. Such construction is relatively expensive and complex as compared to the simplified bottomless charcoal chimney for use with one time use combustible inserts for igniting the charcoal. In addition to lower expense, the charcoal chimney is easier and safer to use, as no inversion, tipping and dumping of the hot charcoal is needed. The mess and danger associated with such existing charcoal chimney systems is a key characteristic as to why some consumers dislike charcoal chimneys.

FIG. 7B illustrates how a user may light device 600 through a side vent of charcoal chimney 646, similar to ignition of the other charcoal igniting devices described herein. Alternatively, a user could choose to ignite device 600 from under the charcoal chimney. In any case, the charcoal ignition device 600 is configured to ignite the charcoal placed in chimney 646 (e.g., on top of device 600) as device 600 hums. As device 600 burns, it will lose its structural integrity, eventually not being able to support charcoal 648 thereabove any longer. At this point, charcoal 648 may fall downward, through the open bottom of chimney 646, onto a surface on which the chimney is supported (e.g., a grill grating). As shown in FIG. 7C, when the charcoal has been ignited (e.g., when ready for use in cooking.), the user may simply lift charcoal chimney 646 upward, and because chimney 646 is bottomless, the chimney will be removed, leaving the hot charcoal 648 in the desired pile, ready for cooking.

Such an insertable charcoal ignition device may have any desired configuration (e.g., similar to any of those illustrated or described herein). In an embodiment, it may resemble a truncated cone shape, with cells or other openings defined therein, to provide for desired air flow, and easy lighting of any desired edge portion. The cells or other structural form may support charcoal briquets thereon, e.g., as described relative to various embodiments herein. Such an insertable embodiment configured for use in a charcoal chimney may or may not be collapsible. Collapsibility may be less of an issue, given the relatively small size of such a charcoal chimney (e.g., no more than 6-8 inches in any given width (e.g., diameter), for insertion into a charcoal chimney of standard width (e.g., diameter). For example, such an insert may have a largest width (e.g., diameter of 4 inches, 5 inches, 6 inches, 7 inches, or 8 inches). Where desired, an embodiment for insertion into a charcoal chimney may be collapsible. For example, such an embodiment (or any embodiment as described herein) may be provided in an initially collapsed configuration, and include a string or other actuation me giber that is pulled or otherwise actuated to cause the initially collapsed charcoal ignition device to expand, to its uncollapsed configuration.

Figure 8:
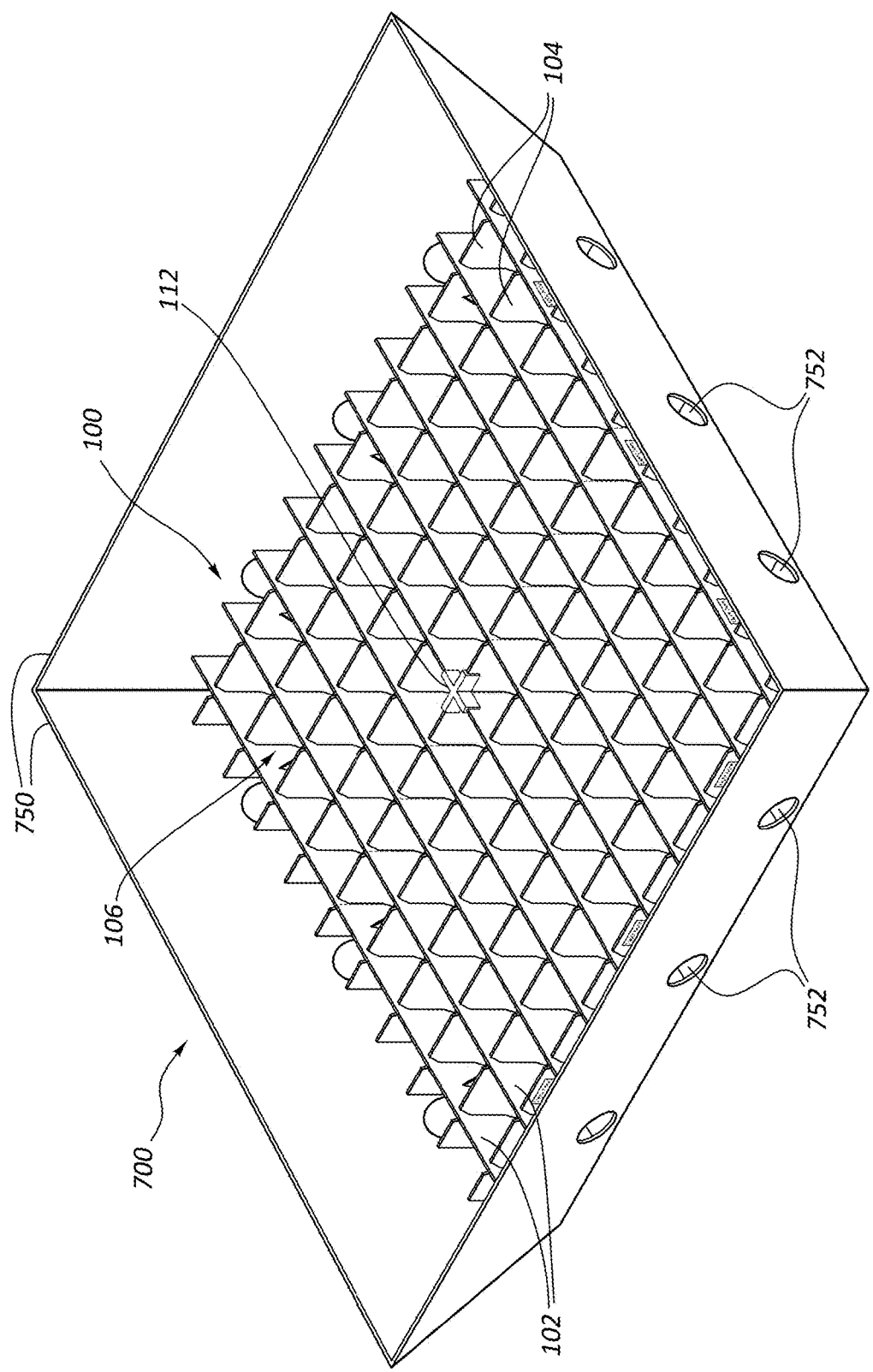
FIG. 8 is a perspective view of another exemplary combustible charcoal igniting device similar to that of FIG. 1, but including elevated side walls around the perimeter of the device.

FIG. 8 shows another configuration, similar to that of FIG. 1, but further including an outer perimeter wind wall 750 around the perimeter of the device 100. The height of wall 750 may be greater than the height of elongate grid members 102 and 104. Such an embodiment could be provided by replacing outermost perimeter grid members with similar elongate grid members, but which are greater in height than the interior elongate grid members 102, 104. The resulting device 700 may provide some protection against wind interfering with ignition of the device 100 and charcoal laid thereon, and/or may aid in "corralling" the charcoal briquets or other material laid thereon, to keep it from falling off device 100.

Wall 750 may be a separate piece that fits around the perimeter of the combustible charcoal igniting device 100, or may be attached to and collapsible %kith device 100. Wall 750 may be formed from the same or similar materials as described above relative to the elongate grid members 102, 104. If desired, one or more vents 752 may be provided, e.g., in a lower portion of wall 750. Such vents 752 may be located at or near the base of wall 750. Such vents may increase air flow into chimney cells 106, promoting faster, more uniform combustion of the combustible charcoal igniting device 100 and associated charcoal briquets or other combustible material placed thereon. As shown in FIG. 8, one or more vents 752 may be aligned with ignition aid notches 110, to facilitate easy lighting.

Figure 9:
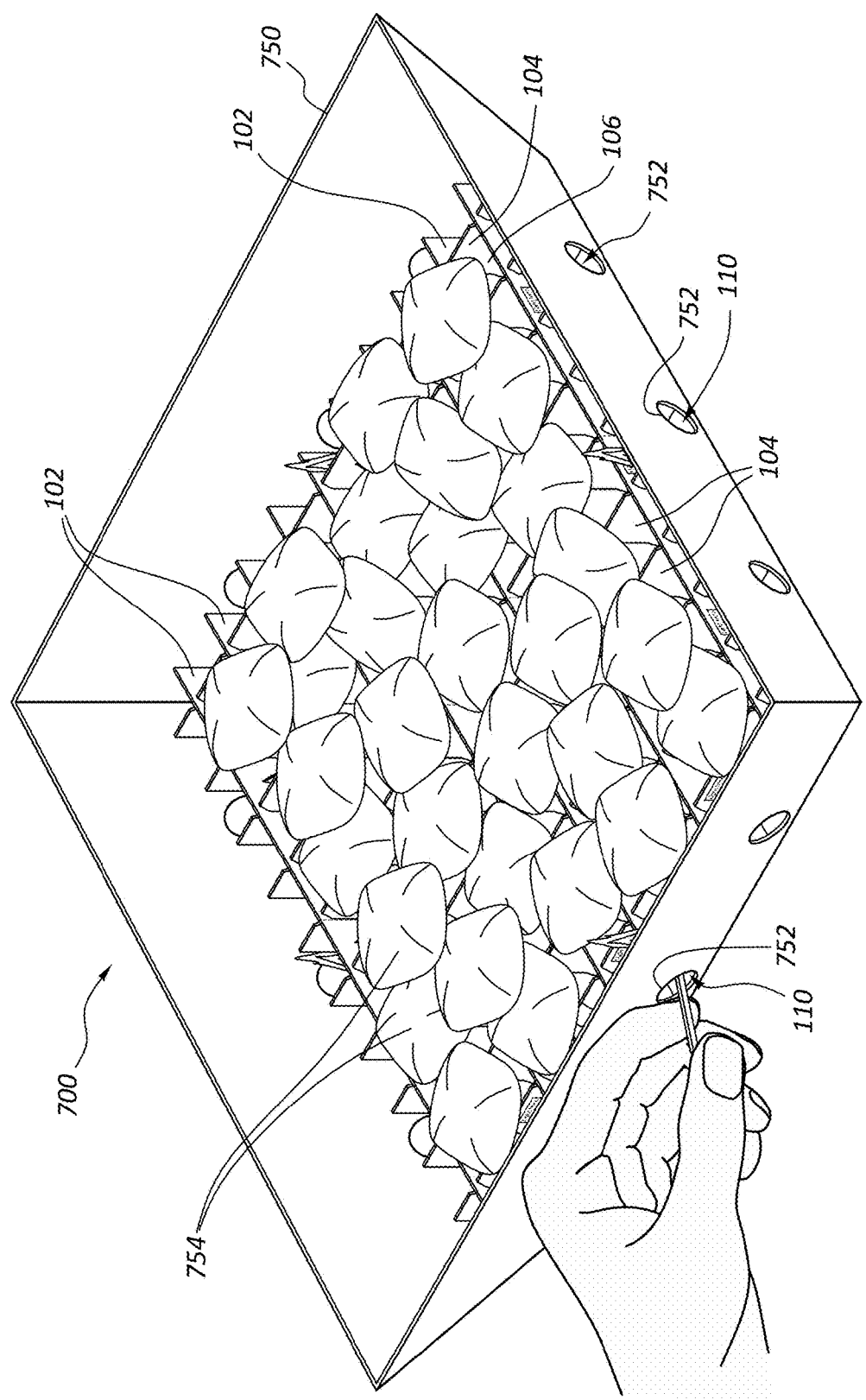
FIG. 9 shows a user lighting an exemplary combustible charcoal igniting device, to ignite charcoal placed thereon.

FIG. 9 shows a user inserting a match through vent 752, to light ignition aid notch 110 of device 100. Charcoal briquets 754 placed on device 100 will quickly be ignited by combustion of underlying device 100. FIG. 9 shows 3 other ignition aid notches (in the center of each side or end) already having been ignited. While FIG. 9 shows placement of charcoal 754 directly onto device 100, it will be appreciated that device 100 could be placed under a grating, and the charcoal placed on top of the grating, but still in close enough proximity to the device under the grating so that combustion of device 100 ignites the charcoal thereabove.

As described herein, a kit may be provided that includes a plurality of charcoal briquets (e.g., briquets 754) and any combustible charcoal igniting device as described herein. In an embodiment, such a charcoal igniting device could be attached to the charcoal bag in which the charcoal is provided. In an embodiment, the device may already be uncollapsed, e.g., in the top, bottom, or side of the charcoal bag, so that a user may simply orient the bag so that the device is at the bottom, and ignite the bag or device.

Figure 10A:
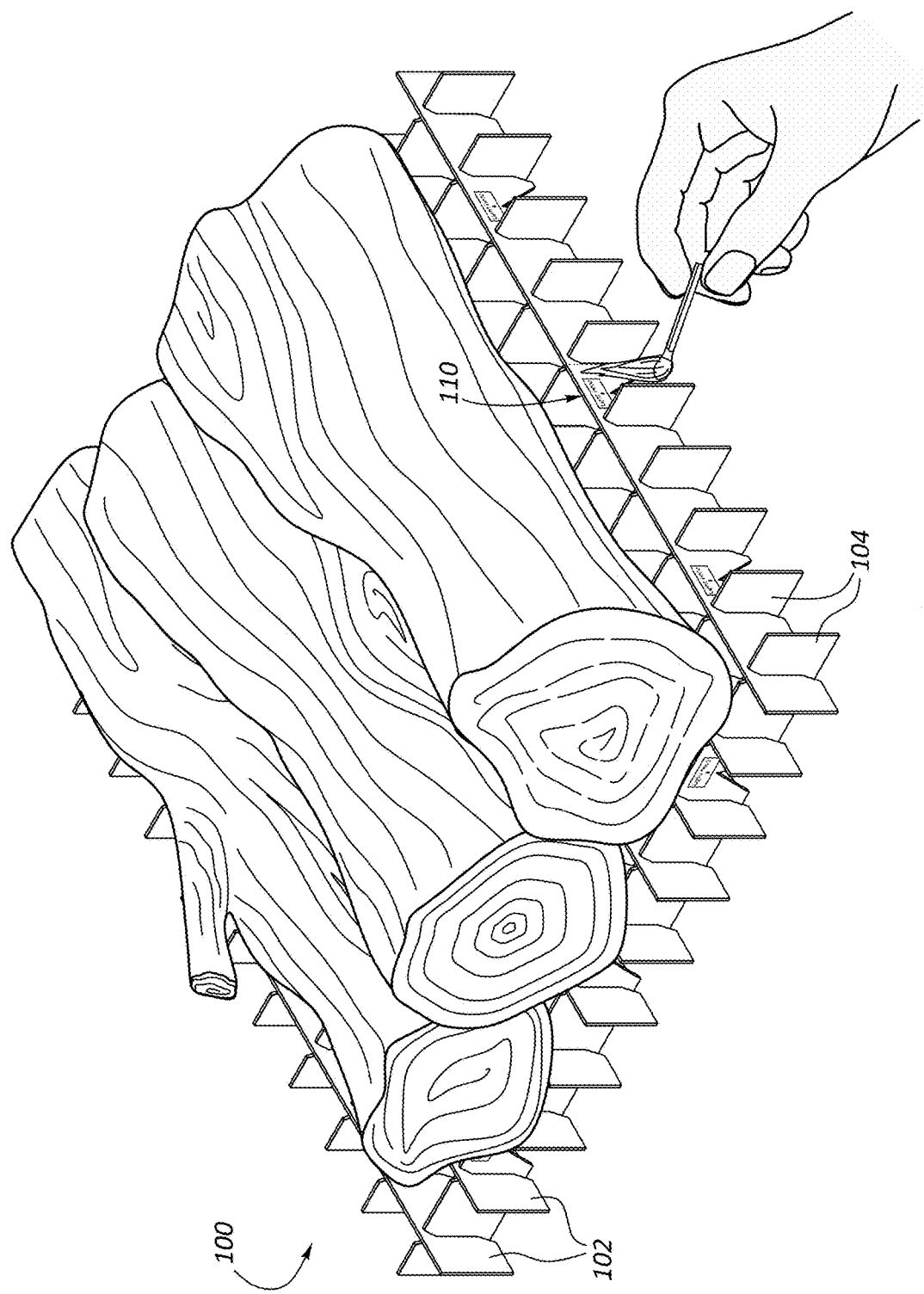
FIG. 10A is a perspective view of an exemplary combustible charcoal igniting device used to ignite wood logs.
Figure 10B:
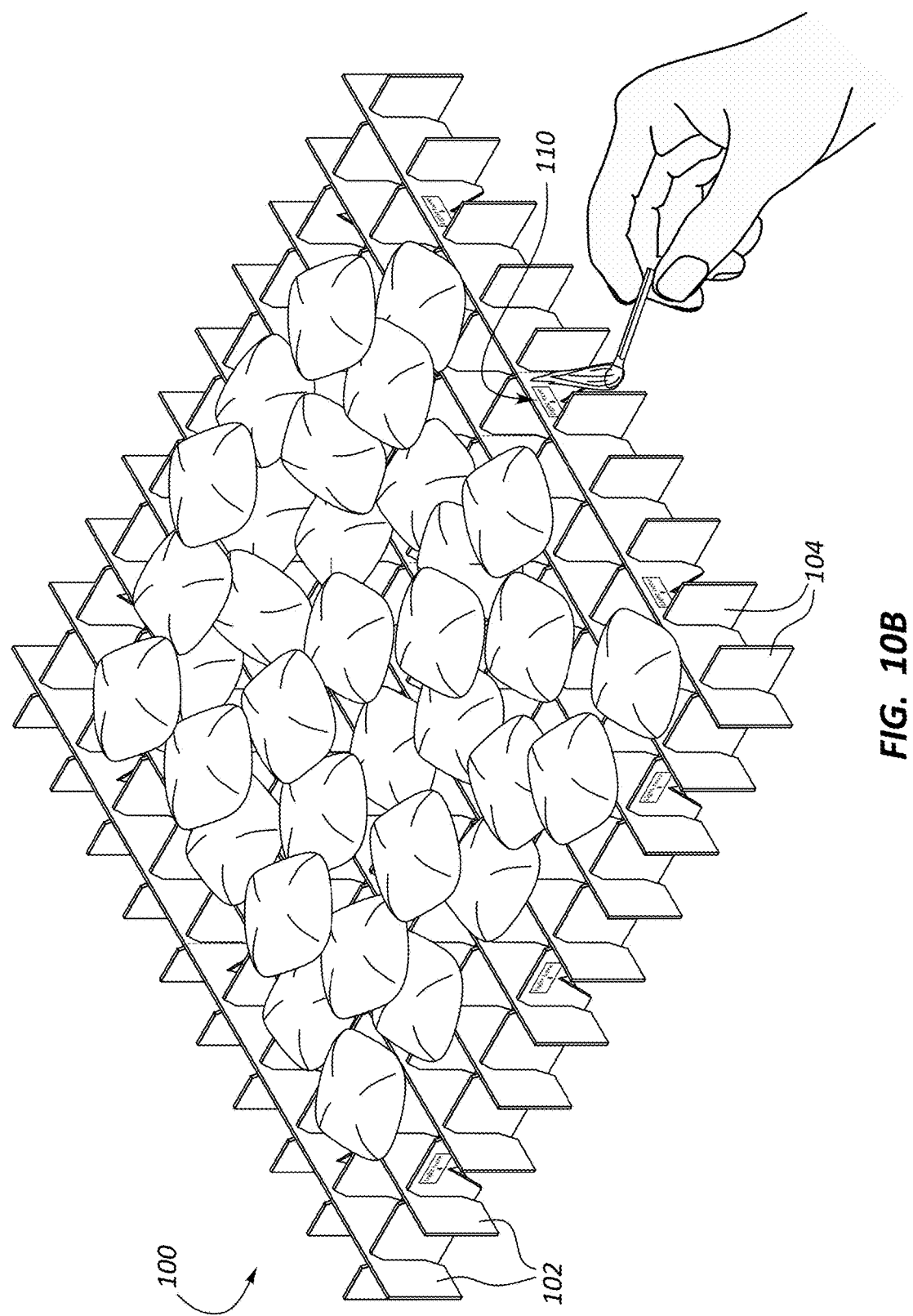
FIG. 10B is a perspective view of an exemplary combustible charcoal igniting device used to ignite charcoal briquets.

Such methods as described herein may be used to ignite charcoal (e.g., briquets, lump, etc.), or any other desired material, such as wood, as shown in FIG. 10 (e.g., for a campfire, fire pit, etc.).

Figure 11:
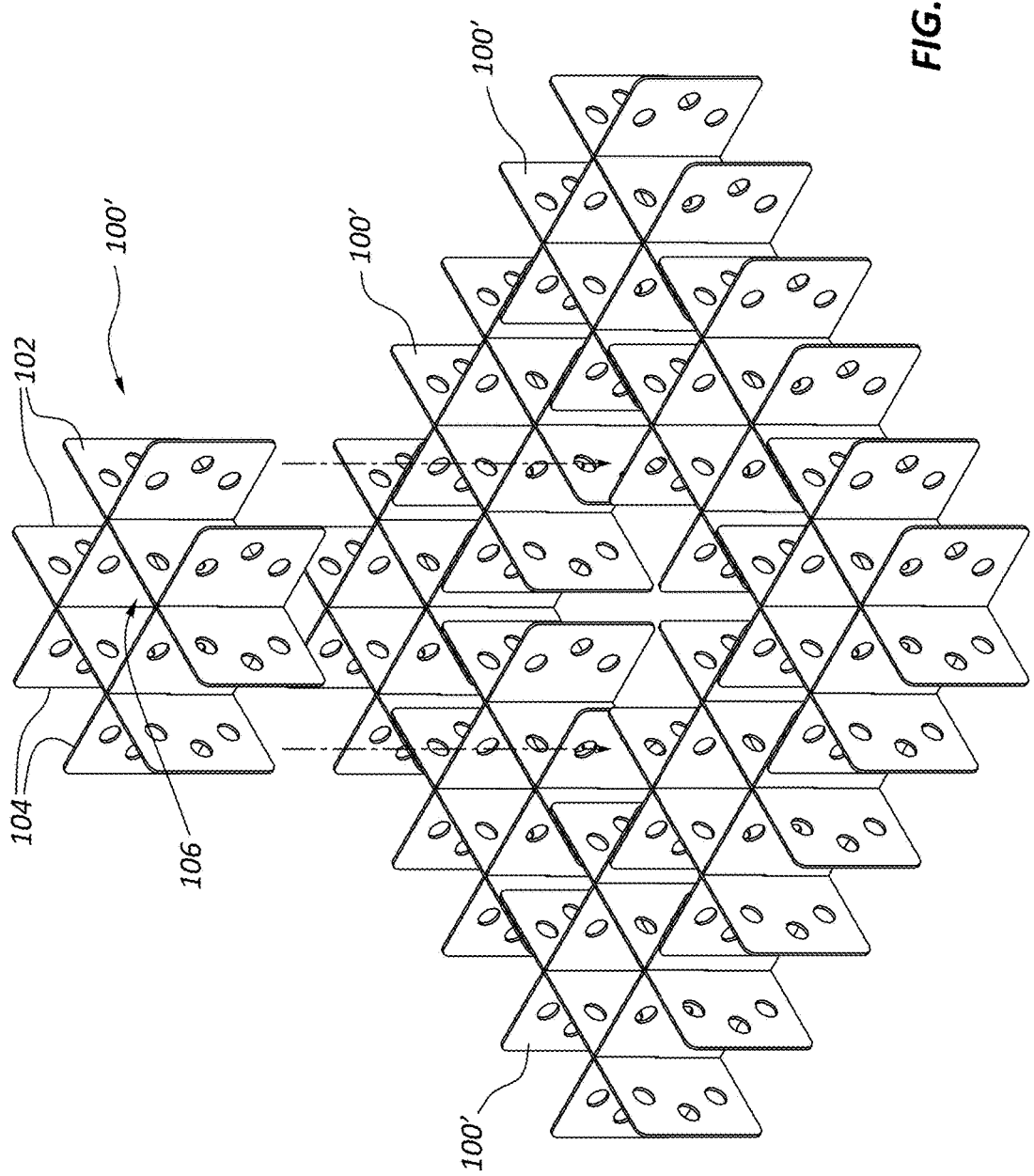
FIG. 11 is a perspective view of a plurality of smaller, modular combustible charcoal igniting devices that may be positioned together, to form a larger combustible charcoal igniting device.

FIG. 11 shows a modified version of a combustible charcoal igniting device, denoted as 100' in FIG. 11. Device 100' similarly includes first and second elongate grid members 102 and 104, and may include any of the other features described herein. Device 100' as shown may be "miniaturized", allowing a user to position a plurality of such smaller modular grid devices 100' into a larger grid, as shown. Such smaller grids (e.g., only including two each of the first and second grid members, in a "tic-tac-toe" arrangement may be collapsed in a similar manner as device 100, although their relative size (for given chimney dimensions) for a 2×2 grid will he considerably smaller than for a larger (e.g., 10×10) grid, as shown in FIG. 1. While a 10×10 grid is shown, other sizes (e.g., 5-15, or 6-12 grid members on any given side), may be employed. Such smaller modular grids may be more easily packaged with a charcoal bag (or other packaging), with an overall length for the group of modular grids that is more manageable than a single larger grid. Various other modular sizes (e.g., a 3×3 grid, etc.) could also be provided.

IV. Comparative Testing

Figure 12:
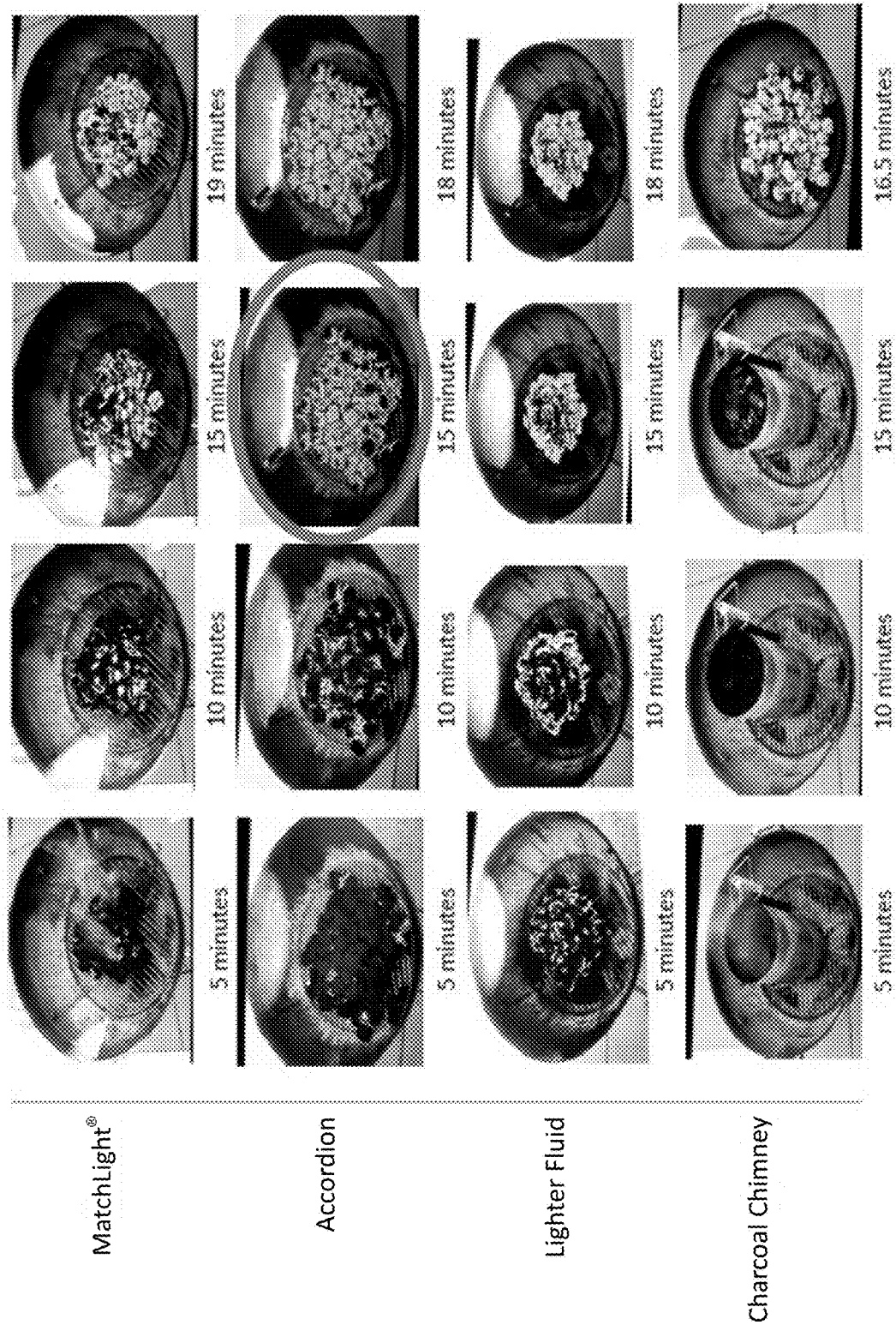
FIG. 12 shows time lapse photographic comparative testing results for ignition of charcoal briquets using an exemplary combustible charcoal igniting device as compared to: (1) briquets with pre-applied lighter fluid (e.g., MATCHLIGHT®); (2) briquets to which lighter fluid is applied immediately prior to ignition; and (3) use of a charcoal chimney.

Testing was done to compare the time to cooking readiness of charcoal briquets ignited through various mechanisms. Time lapse photographs showing the comparative testing results are included in FIG. 12. As shown, various batches of an identical number of charcoal briquets were ignited under the same conditions, other than the ignition method. Four different methods for igniting charcoal briquets were tested. One method included lighting charcoal briquets with pre-applied lighter fluid (i.e., MATCHLIGHT®). The second batch of charcoal briquets used a combustible charcoal lighting device similar to that of FIG. 1 (labeled in FIG. 12 as "Accordion" due to the expandable and collapsible nature of the device). A third batch used lighter fluid, where the recommended volume of fluid was applied immediately prior to ignition. Lastly, a fourth batch was ignited by placing the charcoal briquets in a charcoal chimney and igniting paper or kindling material placed therebelow. The tests were conducted under the same environmental conditions, and the results are presented in photographic time lapse format in FIG. 12 and in Table 1 below.

TABLE I

| | Time to Cooking Readiness (min) |
|---|---|
| MatchLight ® | 19 |
| Accordion | 15 |
| Lighter Fluid | 18 |
| Charcoal Chimney | 16.5 |

As shown above, charcoal briquets ignited using a combustible charcoal igniting device as described herein were cooking ready (determined after the standard degree of ashing over is observed) in the shortest period of time. Further, the charcoal briquets ignited in this fashion did not use any lighter fluid, yet were still able to arrive at cooking readiness before any of the comparative examples.

Achieving even a comparable "time to cooking readiness" without use of lighter fluid is a particularly noteworthy and advantageous result. For example, the use of lighter fluid is regulated in many jurisdictions, and standards associated with use of such materials are likely to be further tightened. As such, the ability to provide a practical alternative to use of lighter fluid, which achieves similar or even improved "time to cooking readiness" characteristics is greatly advantageous.

While the present invention has been described with reference to what are presently considered to be the preferred embodiments, it is to be understood that the invention is not limited to these embodiments. To the contrary, the invention is intended to cover various modifications and equivalent arrangements included within the spirit and scope of the appended claims.

The invention claimed is:

1. A kit comprising:
   a plurality of charcoal briquets; and
   a collapsible combustible charcoal igniting device comprising:
      a plurality of first elongate grid members, wherein each of the first elongate grid members is generally parallel to one another when the device is in an uncollapsed configuration;
      a plurality of second elongate grid members, wherein each of the second elongate grid members are generally parallel to one another and are transverse relative to the first elongate grid members when the device is in an uncollapsed configuration, such that the first and second elongate grid members define a plurality of chimney cells on which the plurality of charcoal briquets may be placed for ignition with the device in an uncollapsed configuration;
   wherein the first elongate grid members are configured to collapse from the uncollapsed configuration in which the first elongate grid members are transverse relative to the second elongate grid members to a collapsed configuration in which the first elongate grid members and second elongate grid members are generally parallel to one another; and
   wherein the first and second elongate grid members comprise a combustible material that can be ignited and that will continue to burn, igniting the plurality of charcoal briquets when placed on the charcoal igniting device.

2. The kit as recited in claim 1, wherein the combustible charcoal igniting device comprises a first crease along each of the first elongate grid members so that the creases of each of the first elongate grid members align with one another, so that the device is collapsible from opposed sides towards a crease line defined by the first creases, reducing the length of the charcoal igniting device when in a collapsed configuration.

3. The kit as recited in claim 1, wherein the charcoal igniting device further comprises one or more ignition aid notches formed into one or more of the first or second elongate grid members disposed along a perimeter of the charcoal igniting device to aid a user in igniting the device.

4. The kit as recited in claim 1, wherein the plurality of chimney cells defined by the first and second elongate arid members have length and width dimensions such that when the plurality of charcoal briquets are placed over the chimney cells, the briquets rest on top of the chimney cells, rather than falling therein.

* * * * *